US009785264B2

(12) United States Patent
Santos

(10) Patent No.: US 9,785,264 B2
(45) Date of Patent: Oct. 10, 2017

(54) TOUCH FILTERING THROUGH VIRTUAL AREAS ON A TOUCH SCREEN

(75) Inventor: Maria Rhea Santos, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 319 days.

(21) Appl. No.: 13/585,752

(22) Filed: Aug. 14, 2012

(65) Prior Publication Data
US 2014/0049502 A1    Feb. 20, 2014

(51) Int. Cl.
  *G06F 3/045*     (2006.01)
  *G06F 3/0354*    (2013.01)
  *G06F 3/0488*    (2013.01)
  *G06F 3/038*     (2013.01)
  *G06F 3/041*     (2006.01)

(52) U.S. Cl.
  CPC .......... *G06F 3/03547* (2013.01); *G06F 3/038* (2013.01); *G06F 3/0416* (2013.01); *G06F 3/0488* (2013.01)

(58) Field of Classification Search
  None
  See application file for complete search history.

(56) References Cited

U.S. PATENT DOCUMENTS

| 5,543,588 | A | 8/1996 | Bisset et al. | |
| 2006/0161871 | A1* | 7/2006 | Hotelling | G06F 3/0485 715/863 |
| 2007/0174788 | A1* | 7/2007 | Ording | 715/816 |
| 2007/0229477 | A1 | 10/2007 | Ludwig | |
| 2009/0273583 | A1 | 11/2009 | Norhammar | |
| 2010/0273533 | A1* | 10/2010 | Cho | G06F 3/04886 455/566 |
| 2011/0310040 | A1* | 12/2011 | Ben-Shalom | G06F 3/0418 345/173 |
| 2012/0161794 | A1 | 6/2012 | Ningrat | |
| 2013/0246861 | A1* | 9/2013 | Colley | G06F 3/0488 714/48 |

FOREIGN PATENT DOCUMENTS

GB    WO2010029289    *    9/2009    .............. G06F 3/048

OTHER PUBLICATIONS

Fontanella, L. et al., "Touch Position Determining Device and Method, and Electronic Touch-Sensitive Device," pp. 1-14, U.S. Appl. No. 11/990,384, filed Jun. 5, 2009.
STMicroelectronics, "S-Touch advanced resistive touchscreen controller with 8-bit GPIO expander," pp. 1-65. Doc ID 14489 Rev 6. www.st.com, Sep. 2011.

* cited by examiner

*Primary Examiner* — Kumar Srilakshmi
*Assistant Examiner* — Ifedayo Iluyomade
(74) *Attorney, Agent, or Firm* — Seed IP Law Group

(57) ABSTRACT

According to one embodiment of the present disclosure, a touch controller includes a touch frame processing component adapted to receive sensor signals containing information about a touch point on a touch screen. The touch frame processing component processes the sensor signals to generate touch information associated with each touch point. A touch coordinate processing component is coupled to receive touch information from the touch frame processing component and includes virtual area parameters that define a plurality of virtual areas on the touch screen. The touch coordinate processing component is operable to identify which one of the plurality of virtual areas contains the current touch point and to report or filter the current touch point as a function of the identified virtual area.

31 Claims, 18 Drawing Sheets

| TIDn | Location Information (X,Y) | Touch-Event (TE) Type | Other Touch Point Parameters (Pressure, Size, Direction, etc.) |

Touch Information (TI)

*FIG. 1B*

TOUCH FILTERING THROUGH VIRTUAL AREAS ON A TOUCH SCREEN

TECHNICAL FIELD

The present disclosure relates generally to touch screens and relates more specifically to the filtering of touch points through virtual areas defined on a touch screen.

BACKGROUND

Touch screens are present in many different types of common modern electronic devices, such as cellular telephones, tablet computers, portable music and video devices, personal digital assistants, portable gaming devices, and so on. In these electronic devices the touch screen is part of the user interface of the device. The touch screen typically includes a display, touch sensors, and a touch controller. The touch sensors are typically some sort of transparent sensor array, such as an ultrasonic, resistive, vibration, or capacitive sensor array, that is attached to or formed as an integral part of the display. When a user touches the sensor array either with a finger or a stylus, for example, the sensor array generates corresponding electronic sensor signals that are provided to the touch controller. From these sensor signals, the touch controller determines the type of "touch event" along with various characteristics of the touch event, and provides this information to processing circuitry in the electronic device. The processing circuitry operates in response to this information to allow a user to control the electronic device or an application running on the processing circuitry through these touches of the touch screen.

The touch controller typically captures frame data from the touch sensors and processes this frame data to determine the type of touch event that has occurred on the touch screen. This processing is typically referred to as touch frame processing and through this processing the touch controller determines the type of touch event and the location of the touch event on the touch screen. The touch controller must detect and report (to the processing circuitry) different types of touch events, such as when a user initially touches the touch screen, when the user has stopped touching the touch screen, and when a touch is moving on the touch screen, and when a moving touch has stopped moving.

Common touch screen device includes a touch sensor, a touch controller and a display. The touch sensor is a user interface device integrated with a panel which, when touch with a finger or stylus, produces signals from which the controller can determine touch event and its touch properties (position, size, pressure etc). The transparent sensor is usually mounted onto the display so that the output can be directly seen by the user together with the device's graphical user interface, thus allowing direct interaction. For example, the user can select a button object on the display screen by directly touching the button on the display. The device application program can determine which object was touched using the information generated by the sensor and reported by the controller. Many hand-held devices such as smart phones, personal digital assistants (PDAs), media players, tablet computers and similar devices include touch screens. As more and more interactive and advanced user applications are developed for these devices, more and more information has to be generated and decoded by the touch controller.

Touch controllers also typically provide high-level functionality, such as gesture recognition, descriptive touch data, shape recognition, the definition of multiple touch areas on the touch screen, single touch or multiple touch detection, and so on. Such high-level functionality requires a lot of information be transferred between the touch controller and the touch sensor and between the touch controller and the processing circuitry. While it is desirable to provide such high-level functionality for applications running on the processing circuitry that utilize such high-level functions, not all applications utilize all or in some cases any of these high-level functions.

There is a need for improved filtering of touches in order to eliminate or lower the unnecessary transfer of information relating to high-level functionality for applications that do not utilize such high-level functions.

SUMMARY

According to one embodiment, a touch controller includes a touch frame processing component adapted to receive sensor signals containing information about a touch point on a touch screen. The touch frame processing component processes the sensor signals to generate touch information associated with each touch point. A touch coordinate processing component is coupled to receive touch information from the touch frame processing component and includes virtual area parameters that define a plurality of virtual areas on the touch screen. The touch coordinate processing component is operable to identify which one of the plurality of virtual areas contains the current touch point and to report or filter the current touch point as a function of the identified virtual area.

According to another embodiment, a method of filtering detected touch points on a touch screen includes determining a location of a touch point on a touch screen, identifying which one of a plurality of virtual areas on the touch screen includes the location the touch point, and filtering reporting of the touch point based upon the identified virtual area.

BRIEF DESCRIPTION OF THE DRAWINGS

FIG. 1B is a diagram graphically illustrating the content of the touch information generated by the touch controller of FIG. 1A.

DETAILED DESCRIPTION

Figure 1A:
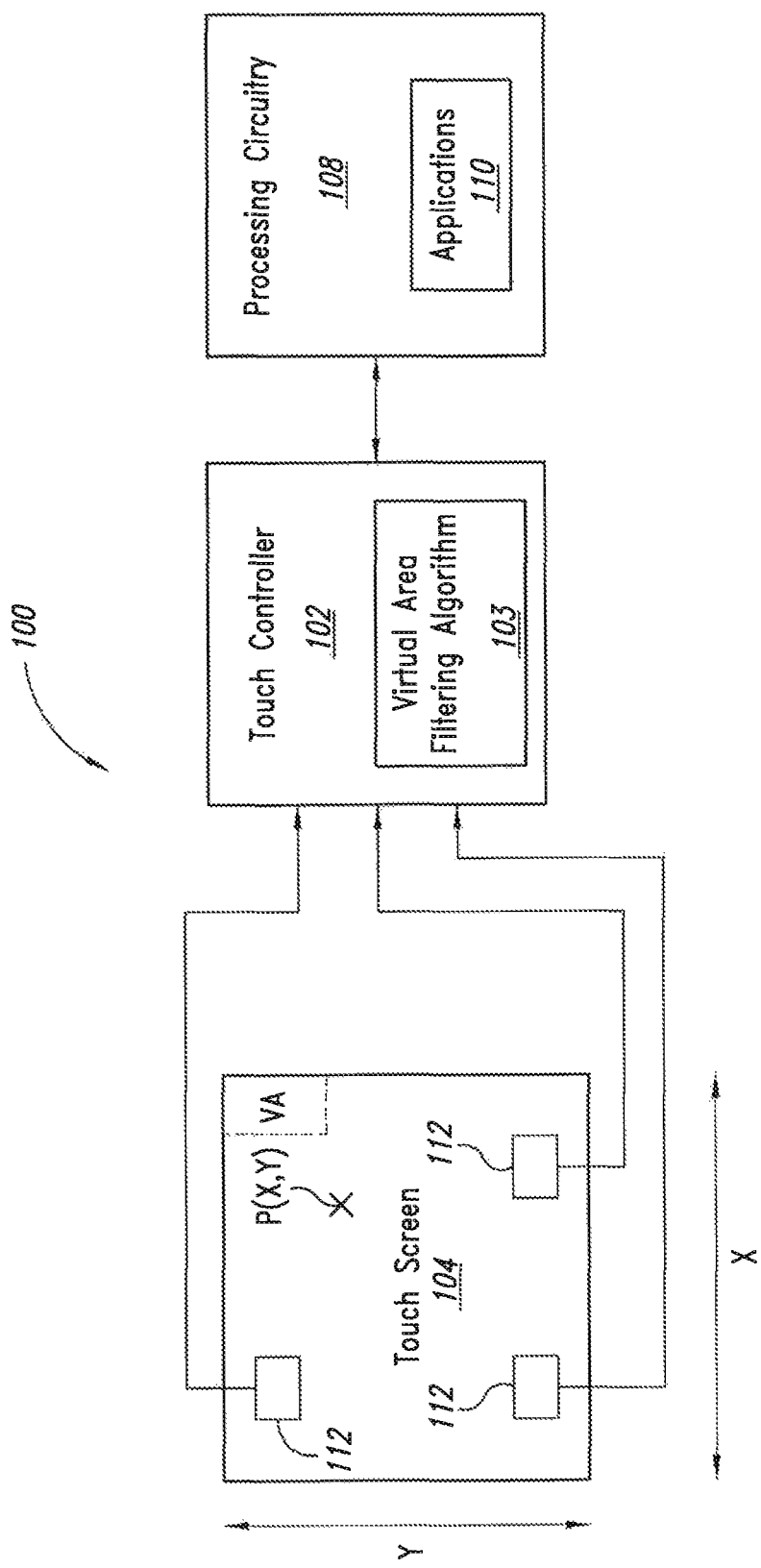
FIG. 1A is a functional block diagram of an electronic device including a touch controller operable to execute a virtual area filtering algorithm according to one embodiment.

FIG. 1A is a functional block diagram of an electronic device 100 including a touch controller 102 that executes a virtual area filtering algorithm 103 according to one embodiment. In operation, the touch controller 102 detects touches or touch points P(X,Y) on a touch screen 104 and associates touch information TI with each detected touch point. The touch controller 102 thereafter executes the virtual area filtering algorithm 103 to detect which virtual area VA defined on the touch screen 104 contains the touch point P(X,Y) and to determine whether to report the touch information TI or filter the touch information (i.e., block reporting of the touch information) to processing circuitry 108), as will be described in more detail below. In this way the touch controller 102 reports only touch information TI for touch points P(X,Y) that the virtual area filtering algorithm 103 determines should be reported to the processing circuitry 108. The touch information TI that the virtual area filtering algorithm 103 generates includes identification information for the appropriate virtual area VA containing the touch point P(X,Y), allowing applications or "apps" 110 running on the processing circuitry 110 that rely on such high-level identification information to take desired actions based on this information, as will also be described in more detail below.

In the following description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

The touch screen 104 includes a number of touch sensors 112 positioned on the touch screen to detect touch points P(X,Y), with three touch sensors being shown in the embodiment of FIG. 1A. Each touch sensor 112 generates a corresponding sensor signal responsive to a touch point P(X,Y) and provides this signal to the touch controller 102 for processing. The touch sensors 112 are typically contained in some sort of transparent sensor array that is part of the touch screen 104. The number and location of the sensors 112 can vary as can the particular type of sensor, such as ultrasonic, resistive, vibration, or capacitive sensors, as will be appreciated by those skilled in the art. Three sensors 112 positioned as shown are illustrated merely by way of example.

A user touching the touch screen 104 with his or her finger, stylus, or other suitable device corresponds to a touch point P(X,Y). In response to a touch point P(X,Y), the sensors 112 generate respective signals that are provided to the touch controller 102 which, in turn, processes these signals to generate touch information TI for the corresponding touch point. The touch information TI that the touch controller 102 generates for each touch point P(X,Y) includes location information and touch-event (TE) information for the touch point, and typically includes other information as well such as the size of the touch point, the pressure of the touch point, a touch-point identifier TIDn, and so on, as will be appreciated by those skilled in the art. This is illustrated graphically in the diagram of FIG. 1B. The location information is an X coordinate and a Y coordinate that together define the location of the touch point P(X,Y) on the surface of the touch screen 104. An X-axis and Y-axis are shown in FIG. 1A, with the X coordinate corresponding to a point along the X-axis and the Y coordinate to a point along the Y-axis. Thus, a touch point $P(X_1,Y_1)$ corresponds to a touch point on screen 104 at location $X_1$ on the X-axis and $Y_1$ on the Y-axis. The touch controller 102 scans the sensor signals of the sensors 112 and processes these signals to generate the touch information TI. The sensed or detected values of the sensor signals from all sensors 112 at a given point in time (i.e. for a given scan) is termed "frame data." Accordingly, the touch controller 102 processes frame data from one or more frames to determine touch information TI for each touch point P(X,Y), as will be described in more detail below with reference to FIGS. 2A-2C.

Figure 2A:
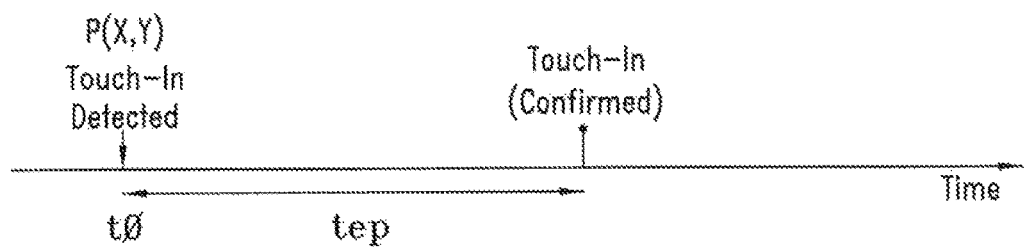
FIGS. 2A-2C are diagrams illustrating touch-in, touch-motion, and touch-out types of touch events, respectively.

As previously mentioned, the touch information TI that the touch controller 102 generates also includes touch-event TE information. This touch-event TE information associates one of three types of touch events with each touch point P(X,Y): 1) touch-in event; 2) touch-motion event; and 3) touch-out event. The detection of a touch-in event is illustrated in FIG. 2A and is the initial occurrence of a touch point P(X,Y). A touch-in event may be defined as moving downward on an area of the touch screen 104 over a period of time tep. So the touch controller 102 determines a touch-in event has occurred if an initial touch point P(X,Y) is detected and the point is determined to be moving downward on an area on the touch screen 104 over the time tep. For example, where the touch screen 104 is a capacitive touch screen, a touch-in event may be defined as a decreasing capacitance value with respect to a "no-touch" reference capacitance value or as a decreasing voltage over the time tep. As seen in the example of FIG. 2A, the touch controller 102 detects an initial touch-point P(X,Y) at a time t0 and determines that this touch point appears to be a touch-in event. The touch controller 102 subsequently monitors parameters associated with this initial touch point P(X,Y) and determines whether the touch point is moving downward on an area of the touch screen 104 over the time tep. During this time period between times t0 and tep the touch controller 102 monitors frame data from the sensor signals from sensors 112. At the time tep after the initial time t0 the touch controller 102 determines the touch point P(X,Y) corresponds to a touch-in event and associates a touch-in event with this touch point.

Figure 2B:
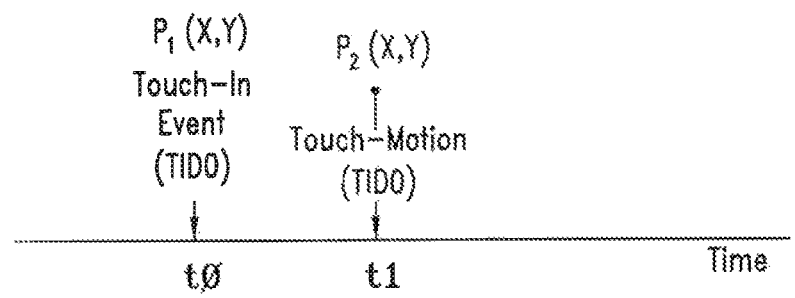

FIG. 2B illustrates the detection of a touch-motion event by the touch controller 102. The touch controller 102 determines a touch-motion event has occurred if a succeeding touch point is associated with a previous touch point P(X,Y) or touch-in event. Assume, for example, an initial touch point $P_1(X,Y)$ has been detected at a time t0 as seen in FIG. 2B and that this initial touch point is a touch-in event. Now assume a succeeding or subsequent touch point $P_2(X,Y)$ is detected at a time t1. Because a prior touch-in event or prior touch point $P_1$ (X,Y) exists, the touch controller 102 associates a touch-motion event with this subsequent touch point $P_2(X,Y)$. A touch-motion event indicates movement across the touch screen 104, such as when a user is sliding his or her finger across the touch screen to perform a desired action. Thus, when a previous touch point $P_1(X,Y)$ exists, either in the form of a touch point that is a touch-in event or a prior touch-motion event, and the touch controller 102 detects a subsequent touch point $P_2(X,Y)$, then the touch controller associates a touch-motion event with this subsequent touch point.

Figure 2C:
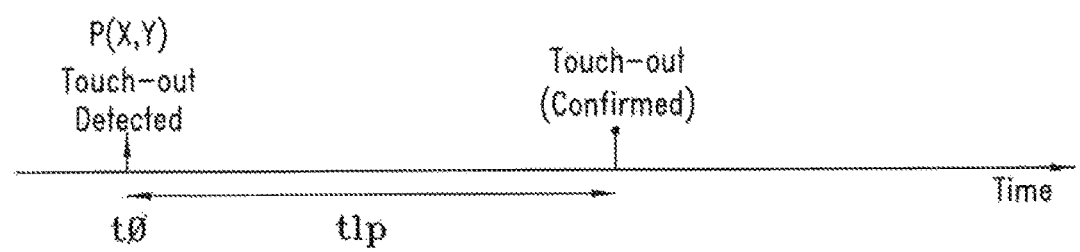

FIG. 2C illustrates the detection of a touch-out event by the touch controller 102. A touch-out event may be defined as moving upward on an area of the touch screen 104 over a period of time tip. The touch controller 102 determines a touch-out event has occurred if "no touch" is detected for a touch point P(X,Y) and the point is determined to be moving upward on an area on the touch screen 104 over the time tip. Where the touch screen 104 is a capacitive touch screen, a touch-out event may be defined as an increasing capacitance value or returning to the no-touch reference capacitance value, or as an increasing voltage over the time tip. FIG. 2C illustrates the touch controller 102 detects a touch-point P(X,Y) at a time t0 and determines that this touch point appears to be a touch-out event (e.g., the associated capacitance or voltage has increased above a threshold value). The touch controller 102 subsequently monitors parameters associated with this touch point P(X,Y) and determines the touch point is moving upward on an area of the touch screen 104 over the time tlp. Thus, at the time tip after the initial time t0 the touch controller 102 determines the touch point P(X,Y) corresponds to a touch-out event and associates a touch-out event with this touch point.

Figure 3:
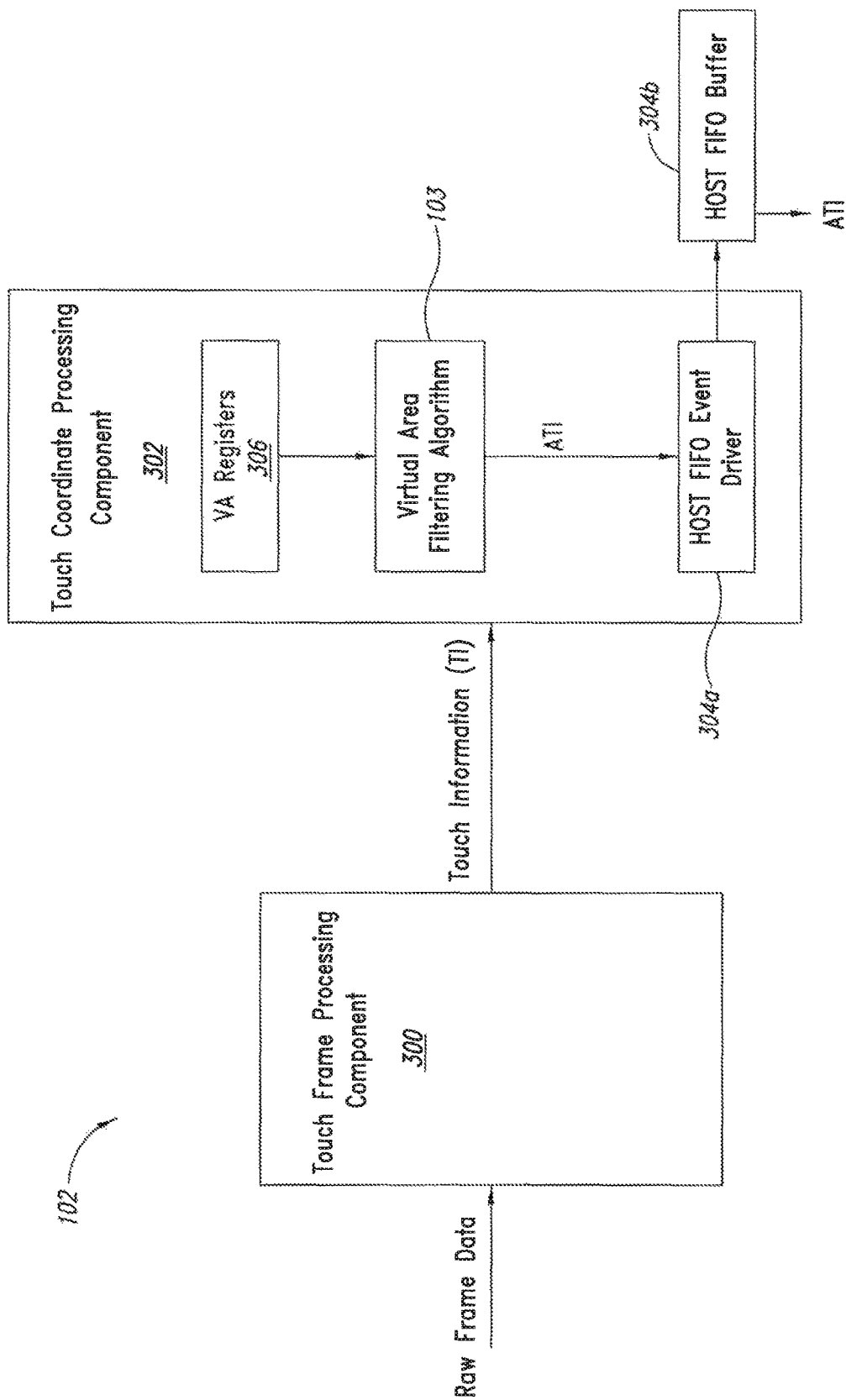
FIG. 3 is a functional block diagram of the touch controller of FIG. 1A according to one embodiment.

FIG. 3 is a functional block diagram of the touch controller 102 of FIG. 1A according to one embodiment. In the embodiment of FIG. 3 touch controller 102 includes a touch frame processing component 300 that receives frame data that includes sensor signals from the touch sensors 112 (FIG. 1A). As previously discussed, the sensor signals from the touch sensors 112 contain information about touch points P(X,Y) on the touch screen 104 (FIG. 1A). The touch frame processing component 300 processes the frame data including the sensor signals to generate touch information TI for detected touch points P(X,Y) on the touch screen 104. As previously described, this touch information TI includes the actual detection itself of a given touch point P(X,Y) along with determination of location information in the form of X and Y coordinates along with event type information for the touch point (i.e., whether a touch-in, touch-motion, or touch-out event is associated with the touch point). The determined touch information for a given touch point P(X,Y) is assigned a touch-event identifier TIDn and this touch-event identifier along with the corresponding location, event type, and other information are output by the touch frame processing component 300.

A touch coordinate processing component 302 receives touch information TI from the touch frame processing component 300 and executes the virtual area filtering algorithm 103 to detect which virtual area VA defined on the touch screen 104 contains the touch point P(X,Y) and to determine whether to report or filter the touch information TI from the application 110 executing on processing circuitry 108 in the electronic device 100 of FIG. 1A. Virtual area (VA) registers 306 store a plurality of configurable parameters that define and characterize each virtual area VA, as will be described in more detail below with reference to FIG. 9. When the virtual area filtering algorithm 103 determines the touch information TI should be reported to the application 110, the touch information TI for the current touch point P(X,Y) along with high-level functionality information associated with the defined virtual areas VA are provided to a first-in-first-out (FIFO) buffer 304. The touch information TI along the high-level functionality information are collectively referred to as advanced touch information ATI. The FIFO buffer 304 includes a software driver 304a and hardware buffer 304b as shown in FIG. 3. The FIFO buffer 304 stores the advanced touch information ATI for a number of touch points P(X,Y) being reported and subsequently provides the stored advanced touch information to the application 110 (FIG. 1A) on a first-in-first-out basis. In this way, when the virtual area filtering algorithm 103 stores the advanced touch information ATI of a detected touch point P(X,Y) in the FIFO buffer 304 the algorithm is said to have "reported" the advanced touch information to the application 110. Conversely, when the virtual area filtering algorithm 103 determines the advanced touch information ATI should not be reported to the application 110, the algorithm does not report or "filters" reporting of this advanced touch information by not providing the advanced touch information to the FIFO buffer 304. Note in the present description, for the sake of brevity the filtering of a touch point P(X,Y) and reporting of the advanced touch information ATI for a touch point may be simply referred to as filtering or reporting of the touch point.

In operation, when the touch frame processing component 300 detects the presence of a touch point P (X, Y), the component determines the type of touch event TE associated with the detected touch point and provides the corresponding touch information TI to the touch coordinate processing component 302. From this touch information TI, the virtual area filtering algorithm 103 determines the virtual area VA location of the detected touch point P(X,Y) and thereafter processes the received touch information to generate high-level touch information related to the defined virtual areas VA, and to determine whether to report or filter the touch point. The virtual area filtering algorithm 103 in this way enables the touch controller 102 to filter the reporting of touch information TI for touch points P(X,Y) based upon the definition of virtual areas VA on the touch screen 104. Where such high-level functionality of filtering based on virtual areas VA is not needed by the applications 110, the virtual area filtering algorithm 103 can configured accordingly, thereby preventing the unnecessary transfer of advanced touch information between the touch controller and the processing circuitry 108 when such high-level functionality is not needed.

Figure 4:
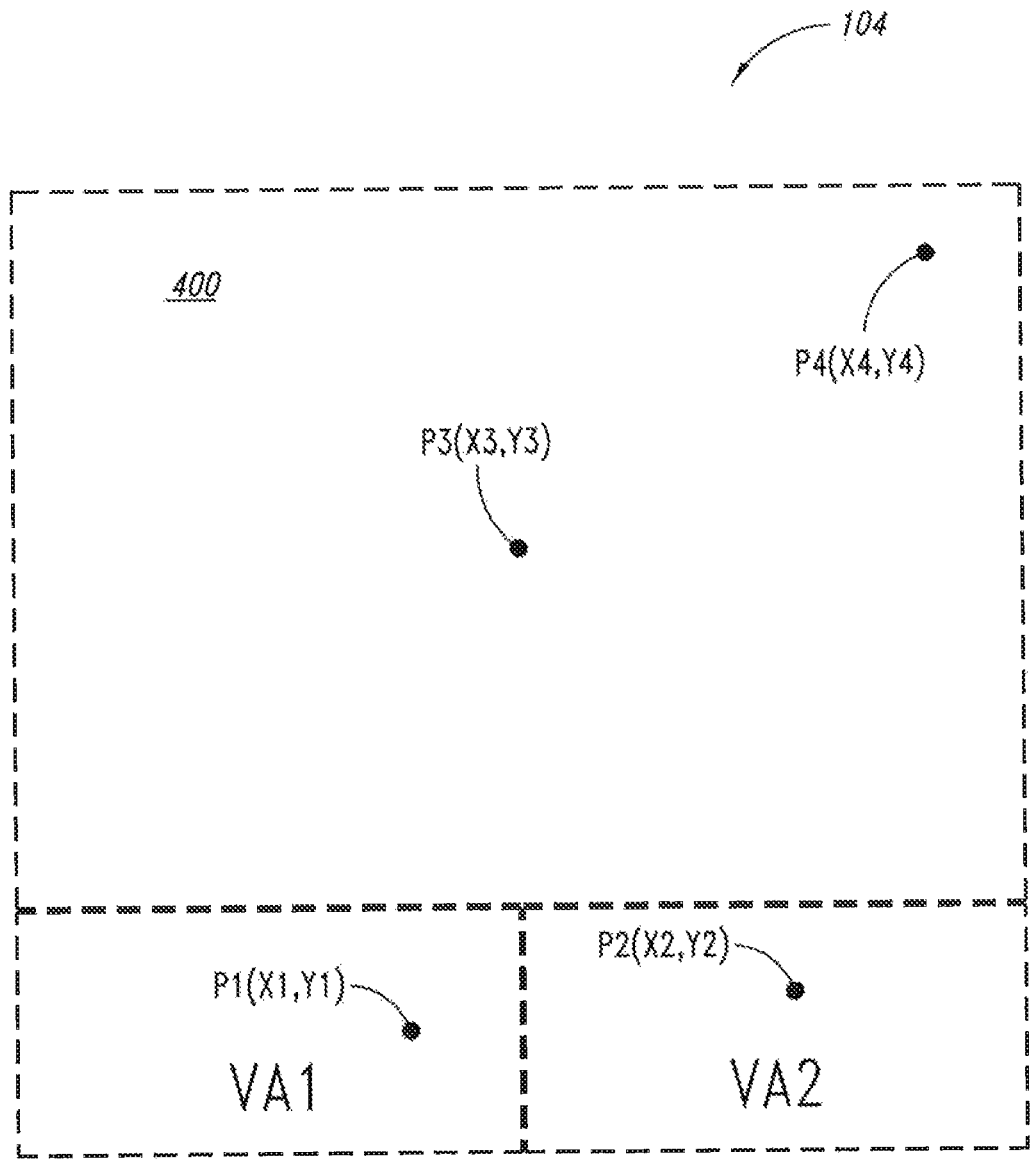
FIG. 4 is a top view of the touch screen of FIG. 1A illustrating location-based filtering of touch points through the definition of virtual areas on the touch screen.

Before describing the operation of the virtual area filtering algorithm 103 in more detail, several sample virtual area VA definitions will first be discussed with reference to FIGS. 4-8. FIG. 4 is top view of the touch screen 104 of FIG. 1A illustrating location-based touch point filtering based upon valid and invalid virtual areas VA defined on the touch screen. In the example of FIG. 4 two virtual areas VA1 and VA2 are defined. The first virtual area VA1 and second virtual area VA2 are defined along the left and right bottom portions of the touch screen 104, respectively. A first touch point P1(X1,Y1) is located in the first virtual area VA1 and a second touch point P2(X2, Y2) located in the second virtual area VA2. The remainder of the touch screen 104, namely the portion 400 of the touch screen not contained in virtual area Va1 or VA2, is as an undefined or invalid virtual area VA of the touch screen.

In FIG. 4, the touch controller 102 filters touch points P(X,Y) as a function of the location of the touch point and the defined virtual areas VA1 and VA2. More specifically, if a touch point P(X,Y) is contained within or located in one of the defined virtual areas VA1 and VA2 then the virtual area filtering algorithm 103 reports the touch information TI for such a touch point along the virtual area VA containing that touch point for use by the applications 110. Thus, the touch information TI reported by the virtual area filtering algorithm 103 to the applications 110 includes a virtual area identification VAID identifying the virtual area VA containing the touch point P(X,Y). There is a maximum number N of virtual areas VA that can be defined on the touch screen 104, and each virtual area is assigned a corresponding virtual area identification VAID1-VAIDN. So in the example of FIG. 4, the touch information TI for the touch points P1(X1,Y1) and P2(X2,Y2) would be reported to the applications 110 running on the processing circuitry 108 of FIG. 1A, including identifications VAID1 for touch point P1(X1, Y1) and VAID2 for touch point P2(X2,Y2). Conversely, the touch points P3(X3,Y3) and P4(X4,Y4) located in the invalid portion 400 of the touch screen 104 are filtered and accordingly not reported to applications 110.

Figure 5:
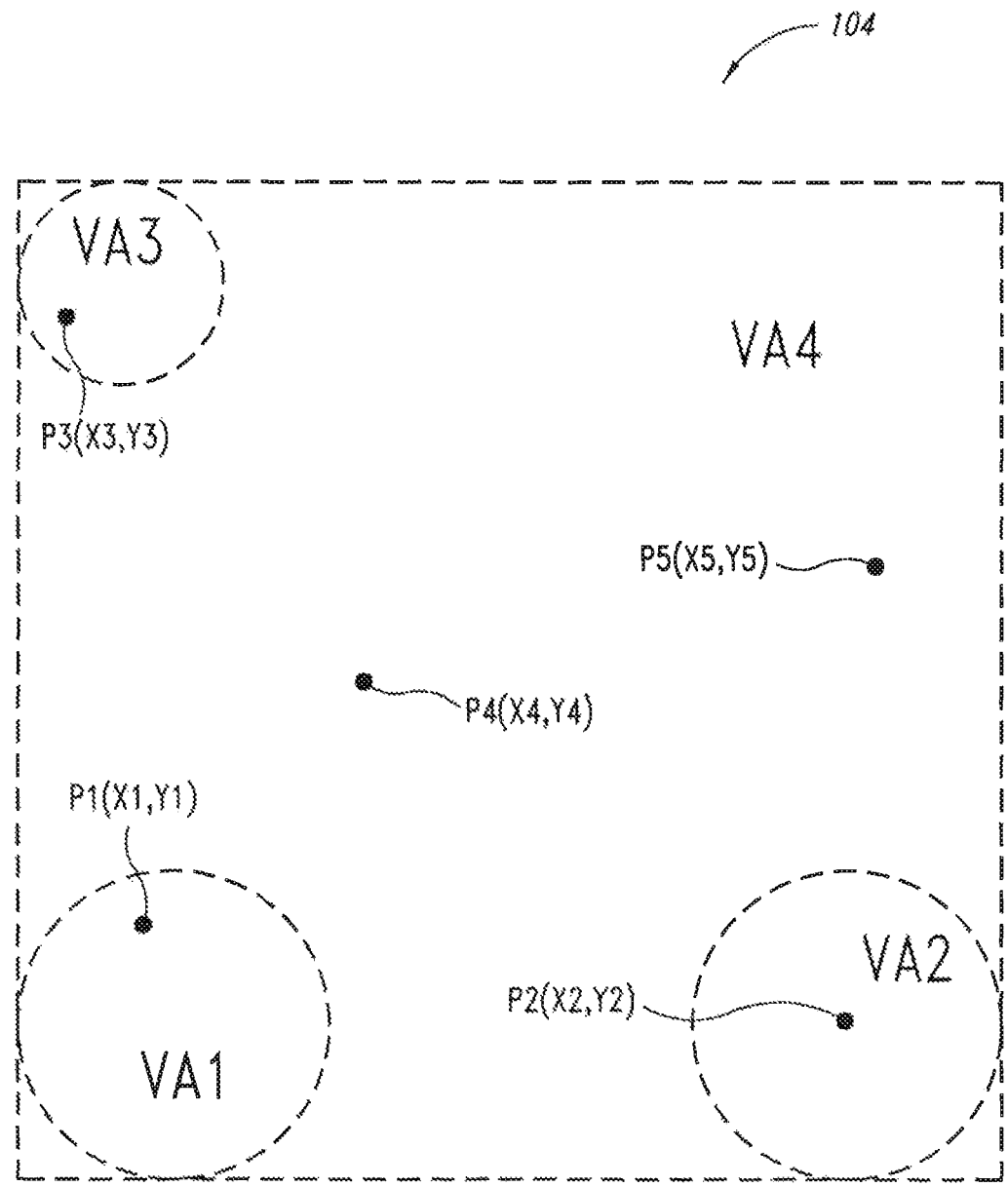
FIG. 5 is a top view of the touch screen of FIG. 1A illustrating another example of location-based filtering of touch points through the definition of virtual areas on the touch screen.

FIG. 5 is a top view of the touch screen 104 of FIG. 1A illustrating another example of location-based filtering of touch points through the definition of multiple virtual areas VA1-VA4 on the touch screen. The example of FIG. 5 illustrates that the virtual areas VA can take on different shapes, with the virtual areas VA1, VA2, and VA3 being circular and the virtual area VA4 being the remaining area of the touch screen 104 not contained in the virtual areas VA1, VA2, and VA3. The virtual areas VA can have any shape that can be suitably defined, such as square, rectangular, circular, elliptical, and so on. This example includes three virtual areas VA1, VA2, and VA4 that are "enabled" and one virtual area VA3 that is "disabled." Each virtual area VA as an enablement parameter that may be set for that area, where the enablement parameter is either enabled such that touch points P(X,Y) occurring in the virtual area will be reported (ignoring other filtering criteria that may result in filtering) or disabled such the touch points occurring in the virtual area will not be reported. In this example, the virtual area filtering algorithm 103 reports touch point P1(X1,Y1) located in virtual area VA1, touch point P2(X2,Y2) located in virtual area VA2, and touch points P4(X4,Y4) and P5(X5,Y5) contained in virtual area VA4. The virtual area VA3 is a disabled virtual area so the touch point P(X3,Y3) located in this area is filtered and thus not reported to the applications 110. The virtual area filtering algorithm 103 reports the advanced touch information ATI including the corresponding virtual area identification VAID for the touch points P1(X1,Y1), P2(X2,Y2), P4(X4,Y4) and P5(X5,Y5). For the touch point P1(X1,Y1) this advanced touch information ATI includes the virtual area identification VAID1, for the touch point P2(X2,Y2) the touch information includes identification VAID 2, while for touch points P4(X4,Y4) and P5(X5, Y5) the touch information includes identification VAID4.

Figure 6:
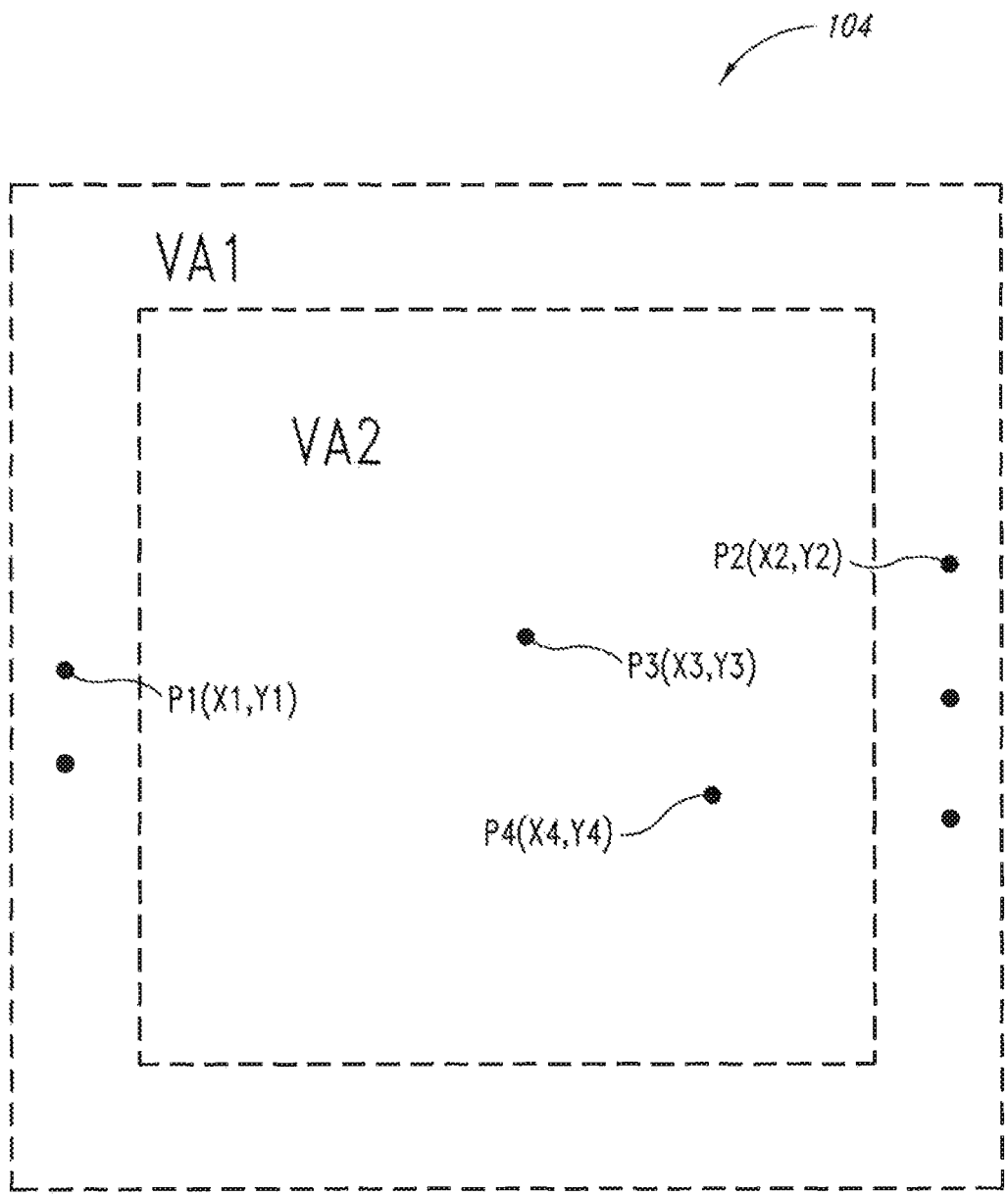
FIG. 6 is a top view of the touch screen of FIG. 1A illustrating layer-based filtering of touch points through the definition of virtual areas on the touch screen.

FIG. 6 is a top view of the touch screen 104 of FIG. 1A illustrating layer-based filtering of touch points P(X,Y) through the definition of virtual areas on the touch screen. In the example of FIG. 6, two virtual areas VA1 and VA2 are defined as shown, each of these virtual areas being a square area. This example illustrates the use of another property that can be defined for a virtual area VA. More specifically, in addition to the parameters defining the shape of the virtual area VA a number of other parameters are defined for each virtual area. These parameters define various characteristics of the virtual area VA. Each of the virtual areas VA1 and VA2 in FIG. 6 has a layer parameter of the virtual area defined. The layer parameter of each virtual area VA can be defined as either a top-layer or a bottom-layer.

The use of the layer parameter enables overlapping virtual areas VA to be utilized in defining various desired overall virtual area shapes. For example, in the example of FIG. 6 the use of the two virtual areas VA1 and VA2 can be utilized to define the outer shaded area for "grip suppression" for example. Some applications 110 ignore touches along the outer periphery of the touch screen 104, namely in the outer shaded area in FIG. 6. This is true because a user, when we merely holding the electronic device 100 containing the touch screen 104, may apply touch points P(X, Y) such as touch points P1(X1,Y1) and P2(X2,Y2) in this outer periphery area of the screen 104.

To detect and filter touch points P(X,Y) such as touch points P1(X1,Y1) and P2(X2,Y2) in the shaded outer periphery region in FIG. 6, the first virtual area VA1 is defined as a bottom layer and the second virtual area VA2 is defined as a top layer. In addition, the virtual area VA1 is a disabled while the virtual area VA2 is enabled. As a result, the virtual area filtering algorithm 103 reports the touch points P3(X3,Y3) and P4(X4,Y4) located in virtual area VA2 while the touch points P1(X1,Y1) and P2(X2,Y2) located in virtual area VA1 are filtered and thus not reported to the applications and 110 running on the processing circuitry 108. This configuration of the virtual areas VA1 and VA2 results in "grip suppression" in that touch points P(X,Y) in the shaded peripheral region are filtered while touch points in virtual area VA2 on the interior of the touch screen 104 are reported.

Through the use of the layer parameter only to virtual areas VA, namely virtual areas VA1 and VA2, are required for the grip suppression configuration just described. Without the layer parameter such functionality could still be performed but it would require the definition of more virtual layers VA. For example, without the layer parameter the same functionality could be performed through the interior virtual area VA2 in combination with four other virtual areas defined around the periphery of the touch screen 104. Thus, five virtual areas VA are required without the use of a layer parameter whereas only the two virtual areas VA1 and VA2 are required with the use of the layer parameter. The layer parameter accordingly simplifies the configuration of virtual areas VA for grip suppression or edge filtering, as will be appreciated by those skilled in the art.

Figure 7:
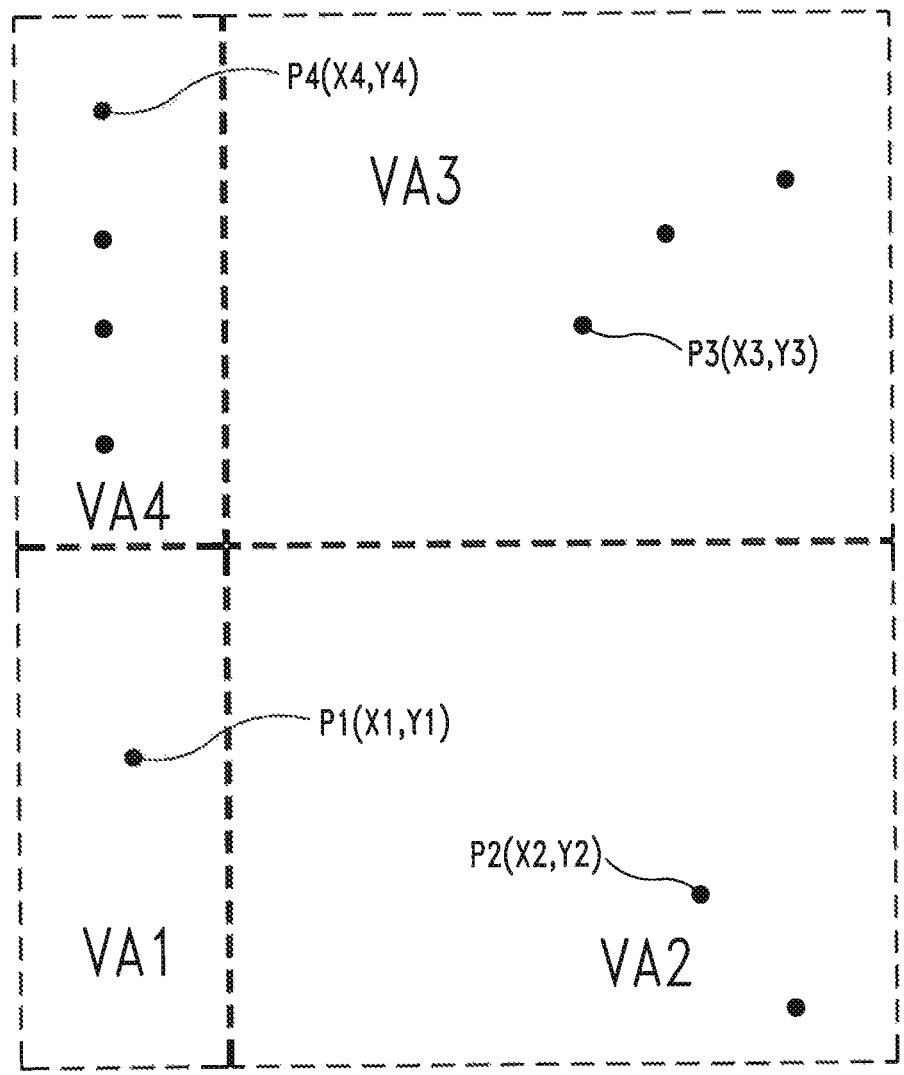
FIG. 7 is a top view of the touch screen of FIG. 1A illustrating touch-count-based filtering of touch points through the definition of virtual areas on the touch screen.

FIG. 7 is a top view of the touch screen 104 of FIG. 1A illustrating touch-count-based filtering of touch points P(X, Y) through the virtual areas VA on the touch screen. A virtual-area-touch-count (VATC) threshold is another parameter that may be defined for each virtual area VA and defines a maximum number of touch points P(X, Y) that will be reported for the particular virtual area. When the VATC threshold of the virtual area VA is set, once a touch count TC indicates the number of touch points P(X,Y) detected in the virtual area has reached the VATC threshold, future touch points in the virtual area are filtered. In the example of FIG. 7, the virtual area VA1 has its VATC threshold equal to 1 such that only one touch point P(X,Y) for this virtual area is reported and all succeeding touch points are filtered, The virtual area VA2 has its VATC threshold set to 2 such that two touch points P(X,Y) detected in this virtual area will be reported while all succeeding touch points will be filtered. Similarly, the virtual areas VA3 and VA4 have their VATC thresholds set equal to 3 and 4, respectively, such that three and four touch points P(X,Y) will be reported for these areas with subsequent touch points then being filtered.

Figure 8:
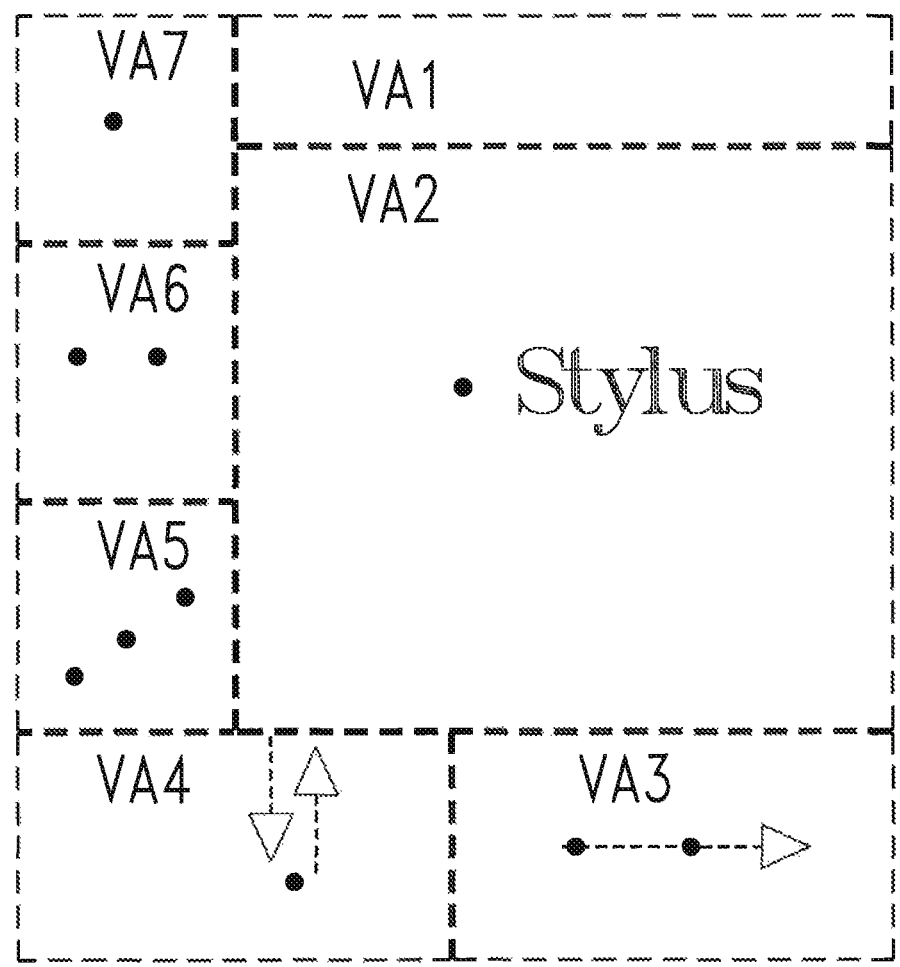
FIG. 8 is a top view of the touch screen of FIG. 1A illustrating other virtual-area-parameters-based filtering of touch points through the definition of virtual areas on the touch screen.

FIG. 8 is a top view of the touch screen 104 of FIG. 1A illustrating other virtual-area-parameters-based filtering of touch points P(X,Y) through the definition of additional various parameters for the virtual areas VA on the touch screen. Referring back to FIG. 1B, recalled the touch information TI associated with each touch point P(X,Y) includes touch event TE type information, size or area information (i.e., whether the touch point corresponds to a stylus, finger, palm, large area, etc.), pressure or weight, and direction or orientation information. The virtual areas VA defined on the touch screen 104 can accordingly include corresponding parameters that allow filtering of touch points P(X,Y) based on the various information contained in the touch information TI associated with each touch point.

FIG. 8 illustrates filtering of touch points P(X, Y) through the definition of various parameters for the virtual areas VA where these parameters correspond to information contained in the touch information TI associated with the touch point. In the example of FIG. 8, the enablement parameter of the virtual area VA1 is disabled meaning that any touch points P(X,Y) detected in this virtual area will be filtered. For the virtual area VA2 a touch-size parameter is set to "stylus" such that only touch points P(X,Y) indicated as corresponding to a stylus touch will be reported. Thus, when the touch information TI for a touch point P(X,Y) indicates the touch point corresponds to a finger or palm touch, the touch point will be filtered if it is detected in the virtual area VA2.

A third virtual area VA3 is configured such that only "moving" touch points P(X,Y) detected in this virtual area will be reported and all other types of touch points will be filtered. Thus, when the touch event TE of a touch point P(X,Y) detected in the virtual area VA3 has the type touch-motion then the virtual area filtering algorithm 103 will report this touch point. If a touch point P(X,Y) detected in the virtual area VA3 has touch event TE type touch-in or touch-out then this touch point will be filtered. In the example FIG. 8, a fourth virtual area VA4 is configured such that only touch-in and touch-out type touch events TE will be reported, and any touch-motion type touch events will be filtered. Thus, the virtual area VA4 is functionally the complement of the virtual area VA3.

Finally, in the example of FIG. 8 the virtual areas VA5, VA6, and VA7 are configured to filter touch points P(X,Y) where the corresponding touch information TI indicates the size of the touch point is a large area touch point and according to defined touch-count criteria indicated by the corresponding circles in each of these virtual areas in FIG. 8. Thus, virtual area VA5 filters any touch point P(X,Y) having a large area size and limits the number of non-large area touch points to three (i.e., three non-large area touch points detected in the virtual area VA5 are reported and then succeeding non-large area touch points filtered). Similarly, the virtual area VA6 filters any touch point P(X,Y) having a large area size and limits the number of non-large area touch points to two (i.e., two non-large area touch points detected in the virtual area VA6 are reported and then succeeding non-large area touch points filtered). The virtual area VA7 filters any touch point P(X,Y) having a large area size and limits the number of non-large area touch points to one (i.e., one non-large area touch point detected in the virtual area VA7 is reported and then succeeding non-large area touch points filtered).

Figure 9:
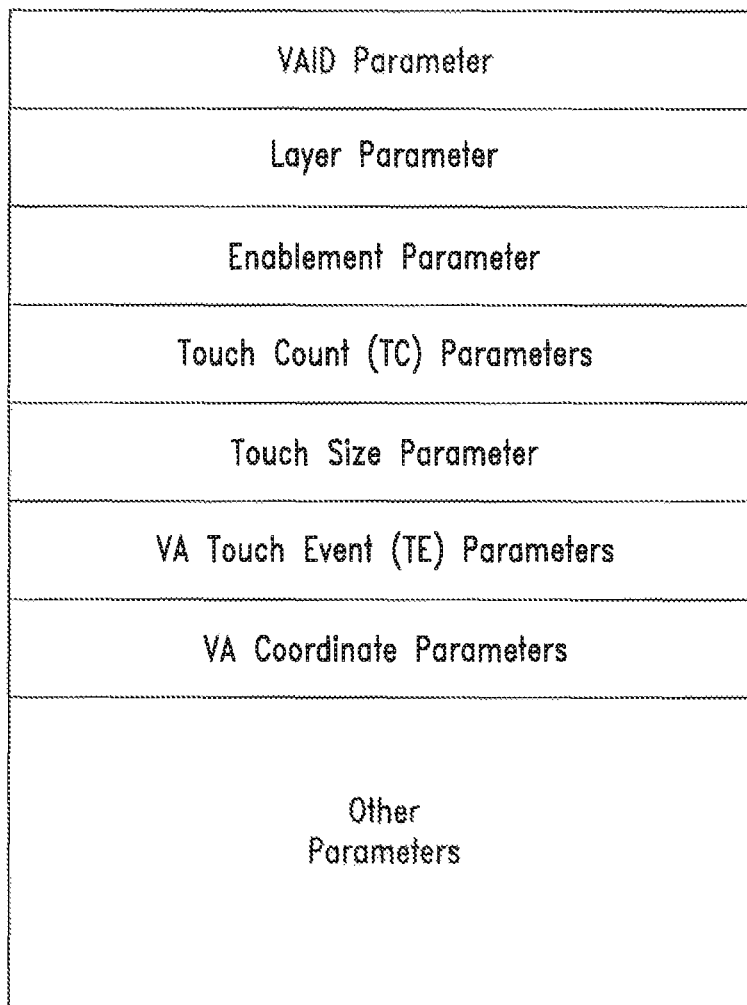
FIG. 9 is a diagram illustrating the configurable parameters of the virtual areas discussed with reference to FIGS. 4-8.

FIG. 9 is a diagram illustrating the configurable parameters of the virtual areas VA discussed with reference to FIGS. 4-8. These configurable parameters are stored in the VA registers 306 of FIG. 3 and include parameters corresponding to information contained in the touch information TI generated for a touch point P(X,Y) as well as other configurable parameters to allow for comprehensive high-level filtering of touch points based upon the defined virtual areas VA. The touch count (TC), touch size, and touch event TE parameters each correspond directly to information contained in the touch information TI generated for touch point P(X,Y) and allow filtering on these bases. The touch count TC is an integer value defining the maximum number of touch points P(X,Y) that may be reported for the virtual area VA. A touch size parameter TSP is set to a value corresponding to one the permissible sizes of the touch point, such as stylus, finger, palm, large area, and so on depending on the specific size information generated as part of the touch information TI. The virtual area touch event TE parameters are set, for filtering purposes, to one or more of the types of touch events that may be associated with the touch point P(X,Y), namely touch-in, touch-out, and touch-motion type of event. This type of filtering was previously described with reference to FIG. 8 and virtual areas VA3 and VA4, where virtual area VA3 is configured such that only "moving" touch points P(X,Y) (i.e., touch event TE is of the type touch-motion) that are detected in this virtual area will be reported and all other types of touch points will be filtered. So in this situation, the VA touch event TE parameters of virtual area VA3 are set to "touch-motion" such that touch-motion events in this virtual area reported. Recall, the virtual area VA4 of FIG. 8 is configured such that only touch-in and touch-out type touch events TE will be reported, and any touch-motion type touch events will be filtered. In this situation, the VA touch event TE parameters for virtual area VA4 are set to touch-in and touch-out.

The virtual area identification VAID parameter is a numeric value assigned to each virtual area VA to identify that area. The VAID parameter has an integer value from 1 to N where N is the maximum number of virtual areas that may be defined on the touch screen 104 (FIG. 1). So each defined virtual area VA is assigned one of the N values. When a given touch point P(X,Y) is found not to be located in any of the defined virtual areas VA, the VAID parameter associated with that touch point is set to an INVALID state or value (i.e., a value indicating that the touch point is not located in a valid or defined virtual area VA), as will be explained in more detail below with reference to FIG. 10. The layer parameter defines a virtual area VA as either a top layer or bottom layer and allows overlapping areas to be utilized in forming desired overall virtual areas on the touch screen 104, as discussed above with regard to FIG. 6. Each virtual area VA may also be enabled or disabled through the enablement parameter, where a touch point P(X,Y) located in the given area is not reported when this parameter is set to disabled and is reported, subject to the other parameters for the virtual area, when the enablement parameter is enabled.

The shape of each virtual area VA is also defined through VA coordinate parameters. The number and definitions of the VA coordinate parameters will vary depending on the number of shapes for the virtual areas VA that are supported by the touch controller 102. For example, if the virtual area VA is a rectangular area as in FIG. 7 then the VA coordinates defining the virtual area are a start point $P_S(X_S,Y_S)$ and an end point $P_E(X_E,Y_E)$. If the virtual area VA is instead a circular area, the VA coordinates defining this type of virtual area would be a center point $P_{CIR}(X_{CIR},Y_{CIR})$ and a radius R. Virtual areas VA having other shapes may be defined through the use of suitable additional VA coordinates that allow for definition of the desired virtual area shapes.

Figure 10:
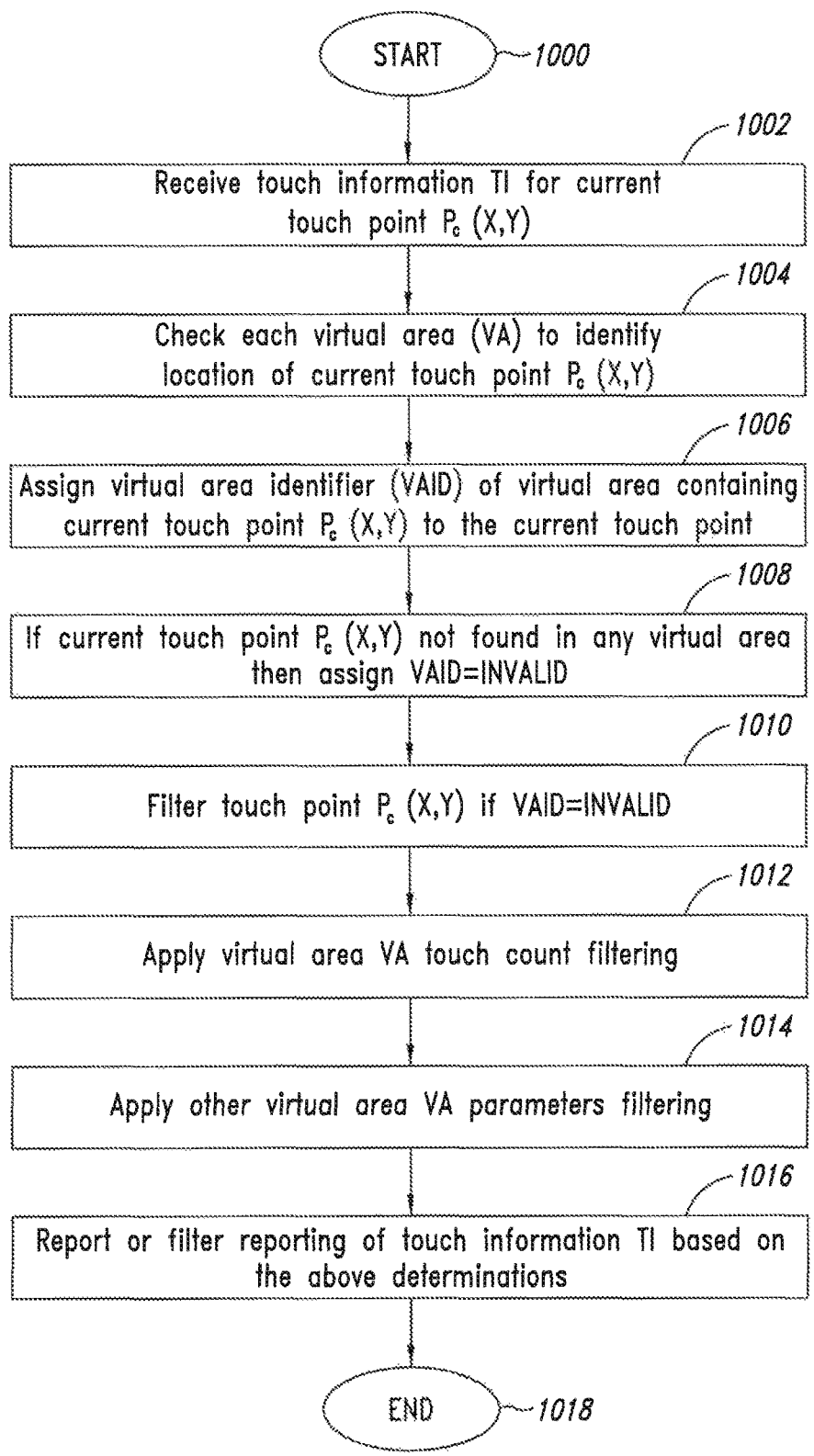
FIG. 10 is a flowchart illustrating a process executed by the virtual area filtering algorithm of FIG. 1 according to one embodiment.

FIG. 10 is a flowchart illustrating a process corresponding to the virtual area filtering algorithm 103 of FIG. 1 according to one embodiment. The process starts in step 1000 and proceeds immediately to step 1002 and receives touch information TI for a current touch point $P_C(X,Y)$ to be processed by the virtual area filtering algorithm 103. From step 1002 the process proceeds to step 1004 and checks each virtual area VA defined for the touch screen 104 to identify the location of the current touch point $P_C(X,Y)$ being processed by the virtual area filtering algorithm 103. Identifying the location of the current touch point $P_C(X,Y)$ in this context means identification of the virtual area VA containing the current touch point $P_C(X,Y)$. The same is true for "identifying the location of the previous touch point $P_P(X,Y)$" discussed below with reference to other figures.

Once the process has identified the virtual area VA containing the current touch point $P_C(X,Y)$, the process proceeds to step 1006 and assigns virtual area identifier VAID of the identified virtual area to the current touch point. For example, if the current touch point $P_C(X,Y)$ corresponds to the touch point P1(X1,Y1) in FIG. 5, then in step 1006 the process assigns the virtual area identifier VAID=1 because in this situation the touch point is located in the virtual area VA1.

After step 1006 the process proceeds to step 1008 and sets the virtual area identifier VAID equal to the invalid value (VAID=INVALID) if the current touch point $P_C(X,Y)$ is not located in any of the defined virtual areas VA. The process then proceeds to step 1010 and if the determination in step 1008 has set VAID=INVALID, meaning the current touch point $P_C(X,Y)$ is not contained in any of the defined virtual areas VA, the process filters reporting of that touch point (i.e., does not report that touch point to the applications 110 running on the processing circuitry 108). From step 1010, the process proceeds to step 1012 and applies touch-count filtering to the current touch point $P_C(X,Y)$ for the identified virtual area VA containing the current touch point. Thus, in step 1012 the process either reports or filters the current touch point $P_C(X,Y)$ depending upon whether the virtual-area-touch-count (VATC) threshold discussed above with regard to FIG. 7 for the corresponding virtual area VA has been reached.

From step 1012, the process proceeds to step 1014 and filters reporting of the current touch point $P_C(X,Y)$ based upon the other virtual area parameters defined for the virtual area VA containing the current touch. For example, as discussed above with reference to FIG. 8 the current touch point $P_C(X,Y)$ may be filtered based upon touch size or type of touch event TE associated with the current touch point as defined by the received touch information TI for the current touch point. After step 1014 the process proceeds to step 1016 and either filters or reports the current touch point $P_C(X,Y)$ as determined by the results of the prior determinations in steps 1008-1014. Recall, reporting of the current touch point $P_C(X,Y)$ includes reporting the location of the current touch point as part of the advanced touch information ATI for the touch point, which also includes the virtual area identifier VAID of the virtual area VA containing the current touch point. The process then proceeds to step 1018 and ends.

Figure 11:
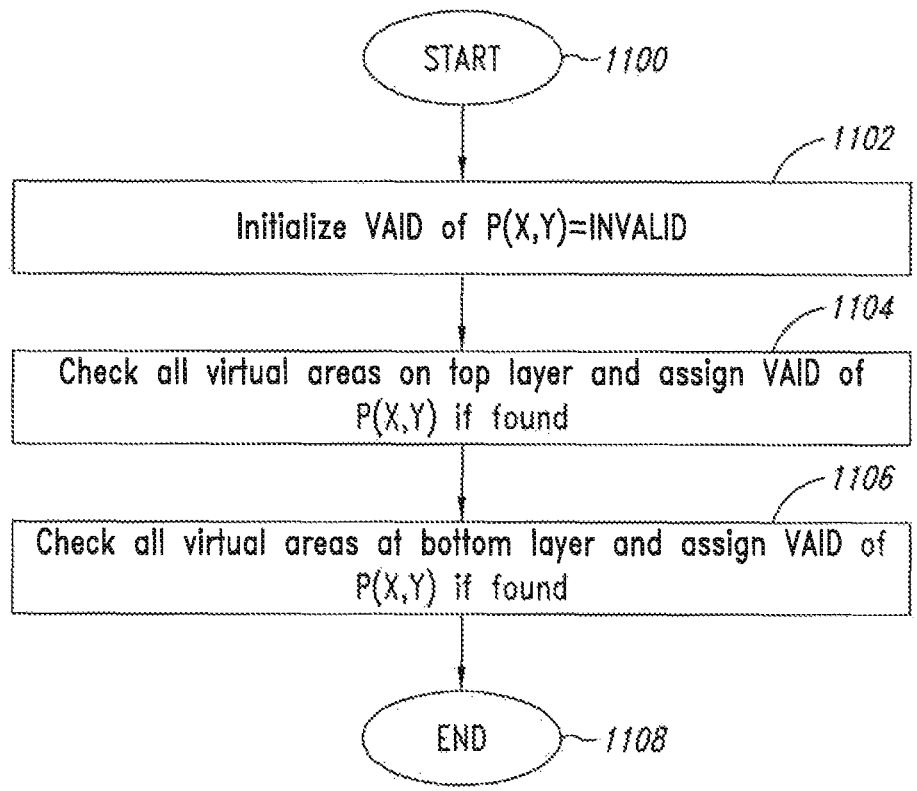
FIG. 11 is a flowchart illustrating in more detail the operation of identifying the virtual area containing a current touch point of FIG. 10.

FIG. 11 is a flowchart illustrating in more detail the operation of identifying the virtual area VA containing the current touch point $P_C(X,Y)$ in step 1004 of FIG. 10. The process begins in step 1100 and proceeds immediately to step 1102 in which the virtual area identifier VAID associated with the current touch point $P_C(X,Y)$ is set invalid (VAID=INVALID). From step 1102, the process then proceeds to step 1104 and for each virtual area VA having its layer parameter set as a top layer the process determines whether the current touch point $P_C(X,Y)$ is located within that virtual area VA. If one of the virtual layers VA having its layer parameter set as a top layer is found to contain the current touch point $P_C(X,Y)$ (i.e., the current touch point is located within that virtual area), then the process in step 1104 sets the virtual area identifier VAID associated with the current touch point equal to the virtual area identifier of that virtual layer.

From step 1104 the process proceeds to step 1106 and for each virtual area VA having its layer parameter set as a bottom layer the process determines whether the current touch point $P_C(X,Y)$ is located within that virtual area VA. Similar to the operation in step 1104, if the current touch point $P_C(X,Y)$ is located within one such virtual area VA, then the process in step 1106 sets the virtual area identifier VAID associated with the current touch point equal to the virtual area identifier of that virtual layer. Thus, if the current touch point $P_C(X,Y)$ is located in one of the virtual areas VA that is a bottom layer, the virtual area identifier VAID of that virtual area is assigned to the touch point in step 1106. If neither step 1104 nor step 1106 identifies the current touch point $P_C(X,Y)$ as being in located in one of the top layer or bottom layer virtual areas VA, then the virtual area identifier VAID associated with the current touch point remains at its initial value set in step 1102, namely the virtual area identifier is set invalid (VAID=INVALID) indicating that the current touch point is not contained in any of the defined virtual areas. The term "top layer virtual area" VA may be used in the present description to refer to a virtual area having its layer parameter set to "top layer." Similarly, the term "bottom layer virtual area" VA may be used to refer to a virtual area having its layer parameter set to "bottom layer."

Figure 12:
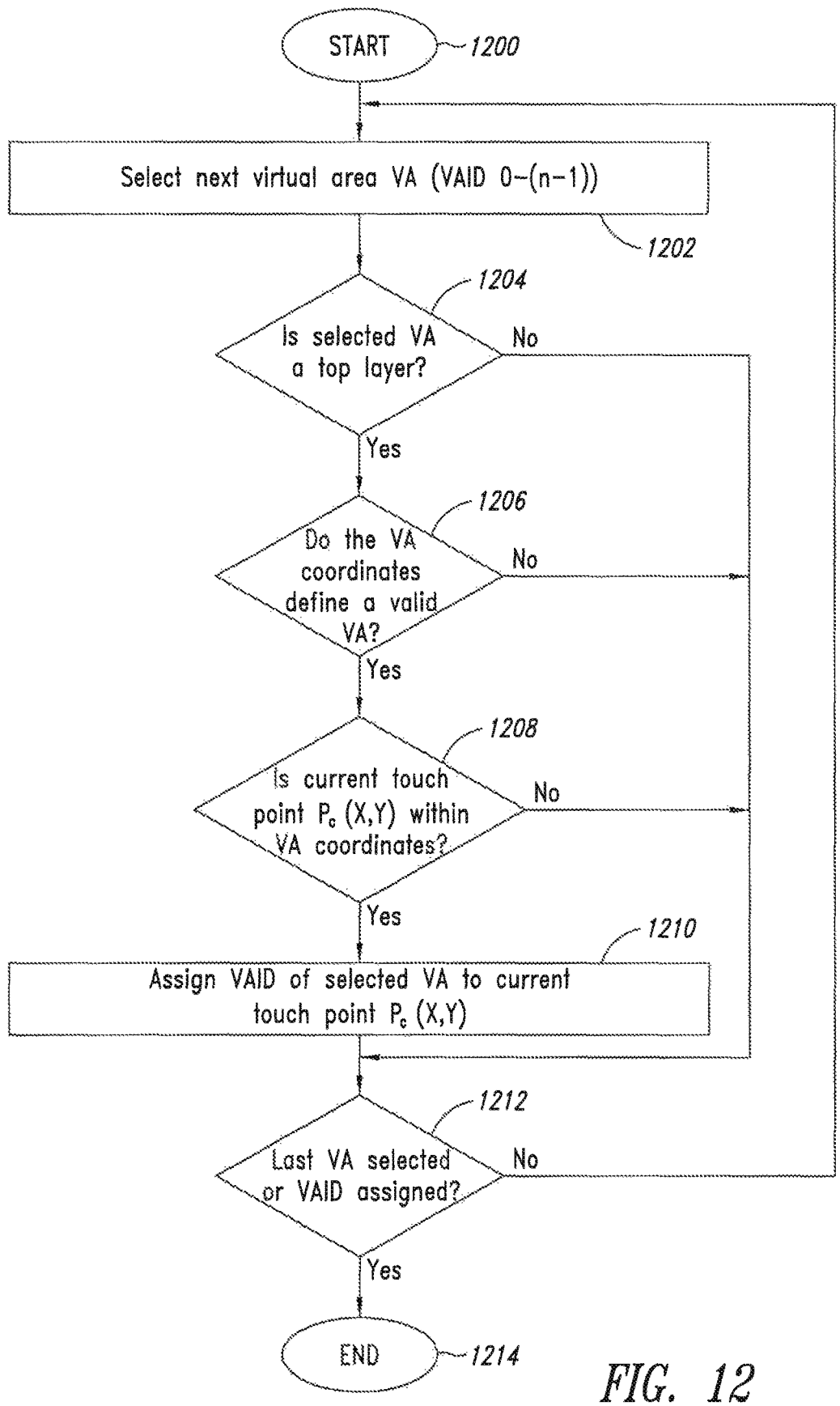
FIG. 12 is a flowchart illustrating in more detail the operation of checking the top layer virtual areas of FIG. 11.

FIG. 12 is a flowchart illustrating in more detail the operation of checking the top layer virtual areas VA described with reference to step 1104 of FIG. 11. Where overlapping top and bottom layer virtual areas VA are used, the top layer virtual areas VA must be examined prior to the bottom layer virtual areas in order to correctly identify the location of the current touch point $P_C(X,Y)$. This will now be described in more detail with reference to FIG. 6. In FIG. 6 assume the first virtual area VA1 is a bottom layer virtual area and the second virtual area VA2 is a top layer virtual area. Next assume the current touch point $P_C(X,Y)$ is the point P3(X3,Y3). If the virtual areas VA were simply examined from virtual area VA1 to VAN (i.e., examine VA1, then VA2, then VA3, and so on through VAN) then the current touch point P3(X3,Y3) would be assigned to virtual area VA1. Starting with the top layer virtual areas VA ensures that the current touch point P3(X3,Y3) is properly assigned to top layer virtual area VA2 in the example of FIG. 6.

Returning now to FIG. 12, the process begins in step 1200 and proceeds immediately to step 1202 in which the next virtual area VA is selected. Initially, in step 1202 the process selects the virtual area VA1 and then proceeds to step 1204 and determines whether the virtual area VA1 is a top layer virtual area. If the determination in step 1204 is positive, indicating the virtual area VA1 is a top layer virtual area, the process then proceeds to step 1206 and determines whether the virtual area (VA) coordinates of virtual area VA1 define a valid virtual area. When the determination in step 1206 is positive, the process proceeds to step 1208 and determines whether the current touch point $P_C(X,Y)$ is contained or located within the current selected virtual area VA1. Each virtual area VA is defined by VA coordinates that characterize or define the shape of the virtual area. The VA coordinates defining each of the virtual areas VA1-VAN are stored in the VA registers 306 in the touch controller 102 as shown in FIG. 3 and as previously discussed in more detail with reference to FIG. 9. In step 1208, the process utilizes the VA coordinates for the virtual area VA1 to determine whether the current touch point $P_C(X,Y)$ is located within the virtual area VA1. If the determination in step 1208 is positive this indicates that the current touch point $P_C(X,Y)$ is located within the currently selected virtual area being examined, namely VA1. In this situation the process proceeds to step 1210 and assigns the virtual area identifier VAID1 of virtual area VA1 in the advanced touch information ATI for the current touch point $P_C(X,Y)$. After step 1210 the process proceeds to step 1212 and determines whether the last virtual area VA has been selected or the virtual area identifier VAID was assigned in step 1210. When the determination in step 1212 is positive the process proceeds to step 1214 and terminates after having examined all top layer virtual areas VA or after having assigned the virtual area identifier VAID of one of the top layer virtual areas VA to the current touch point $P_C(X,Y)$. Each current touch point $P_C(X,Y)$ can have only one assigned valid virtual area identifier VAID, or have its virtual area identifier assigned as INVALID.

Returning now to step 1204, when the determination in this step is negative the selected virtual area, which is the initial virtual area VA1 at this point, is not a top layer virtual area and so the process proceeds immediately to step 1212 and determines whether the selected virtual area VA1 is the last virtual area to be selected and examined. Once again, when the determination in step 1212 is positive the process proceeds to step 1214 and terminates after having examined all top layer virtual areas VA. In the present example, N>1 so the initial selected virtual area VA1 is not the last defined virtual area VA so the determination in step 1212 is negative and the process returns to step 1202 and selects the next virtual area VA2 for examination.

Returning now to step 1206, when the determination in this step is negative the VA coordinates for the selected virtual area VA do not define a valid virtual area. For example, where the selected virtual area VA is to be rectangular or square shaped and the start point $P_S(X_S,Y_S)$ and an end point $P_E(X_E,Y_E)$ are set to predetermined values, such as $P_S(X_S,Y_S)=P_E(X_E,Y_E)=(0,0)$, then the currently selected virtual area VA do not define a valid virtual area. In other words, the currently selected virtual area VA is an invalid virtual area. In this situation, the process proceeds from step 1206 to step 1212.

Finally, returning now to step 1208 when the determination in this step is negative this indicates that the current touch point $P_C(X,Y)$ is not contained within the selected virtual area VA. When this is true, the process proceeds from step 1208 step 1212 and once again determines whether all top layer virtual areas VA have already been selected and examined.

Figure 13:
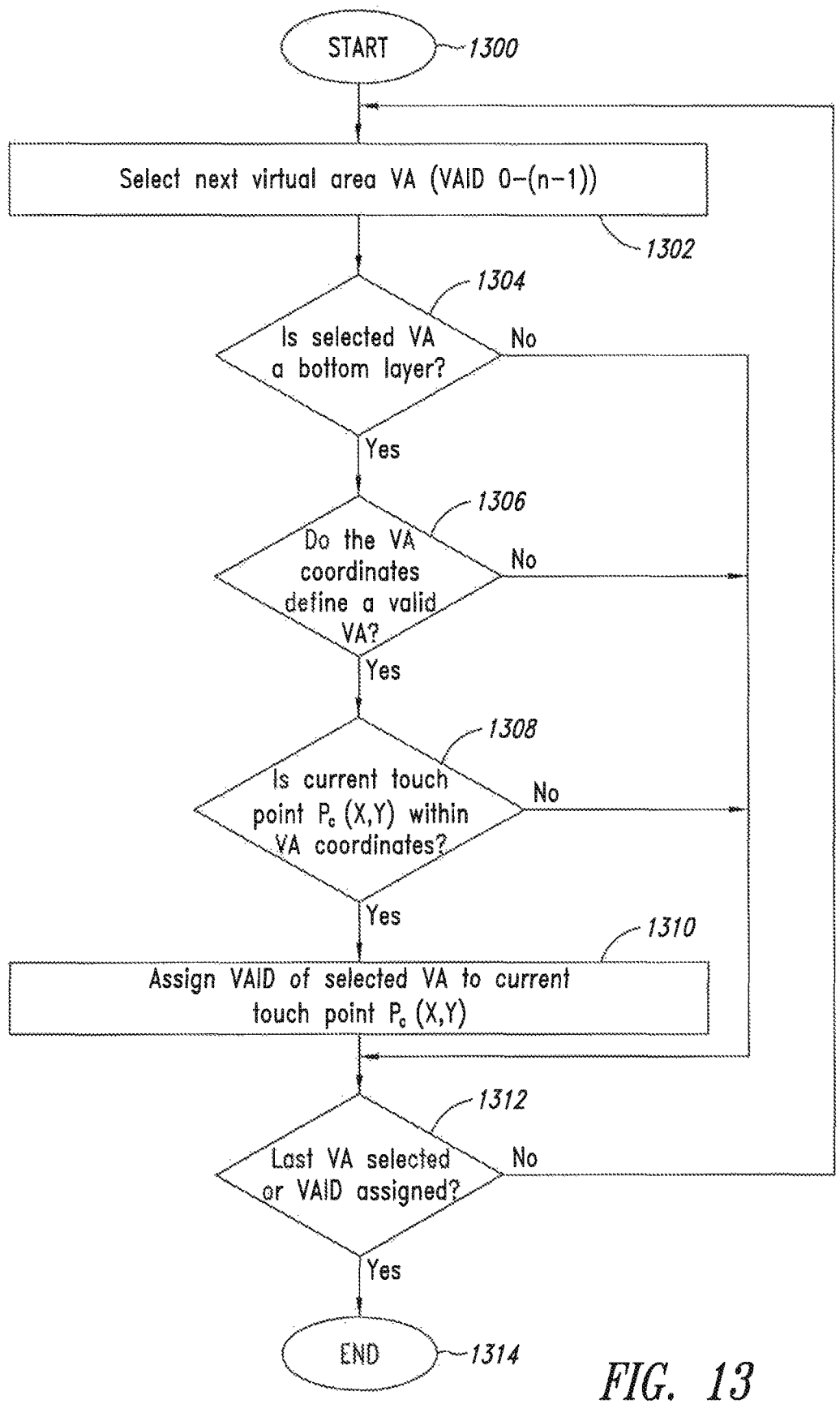
FIG. 13 is a flowchart illustrating in more detail the operation of checking the bottom layer virtual areas of FIG. 11.

FIG. 13 is a flowchart illustrating in more detail the operation of checking the bottom layer virtual areas VA described with reference to step 1106 of FIG. 11. The process of FIG. 13 includes steps 1300-1314 that correspond to the steps 1200-1214 in the flowchart of FIG. 12 except that in steps 1300-1314 bottom layer virtual areas VA are examined to determine whether the current touch point $P_C(X,Y)$ is located in one of these bottom layer virtual areas. Because the process of FIG. 13 is substantially the same as that of FIG. 12 except for examination of the bottom layer virtual areas VA, this process of FIG. 13 will not be described in more detail herein.

In one embodiment, the processes of FIGS. 12 and 13 are performed not only on the current touch point $P_C(X,Y)$ has just described above, but are also performed on the previous touch point $P_P(X,Y)$ to determine the virtual area VA in which the previous touch point is located. The location of the previous touch point $P_P(X,Y)$ is utilized in touch-count filtering of the current touch point $P_C(X,Y)$ has described in step 1012 of FIG. 10 and as will be described in more detail below with reference to FIG. 14. In another embodiment, the location of the current touch point $P_C(X,Y)$ is saved in the touch controller 102 for use as the location of the previous touch point $P_P(X,Y)$ when a subsequent touch point is being processed or examined.

Figure 14A:
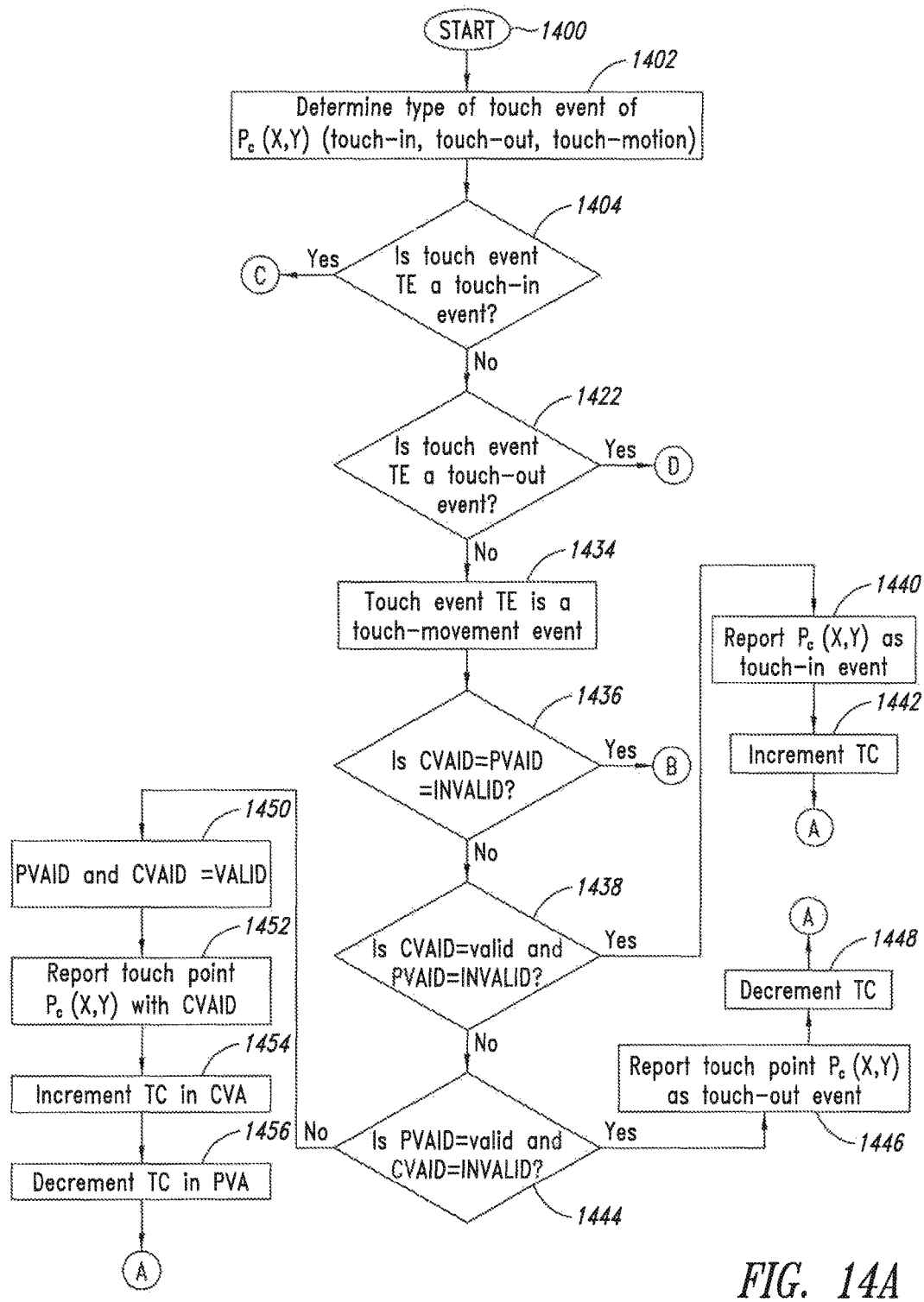
FIGS. 14A-14C are a flowchart illustrating in more detail the operation of applying touch count filtering of FIG. 10.
Figure 14B:
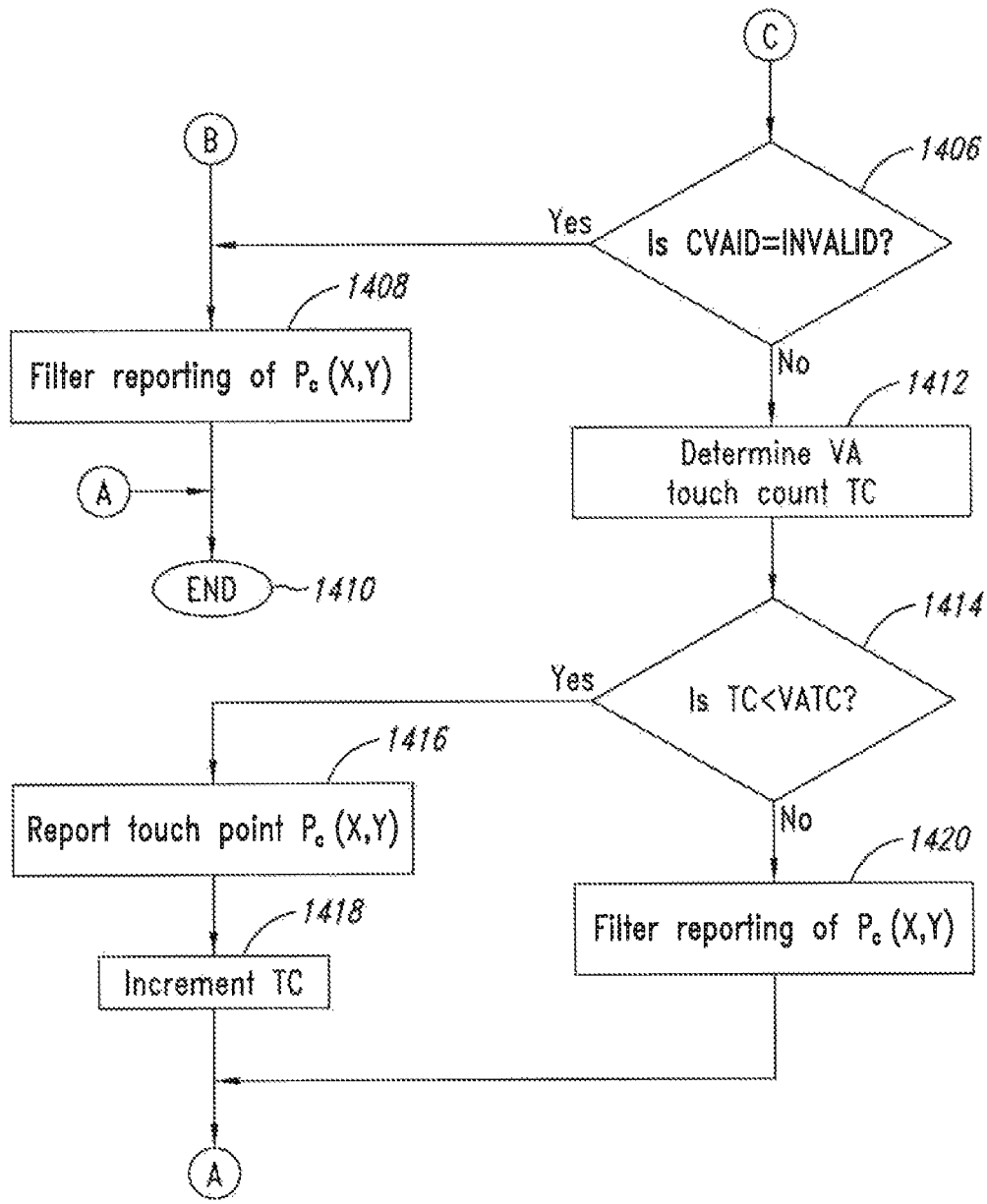
Figure 14C:
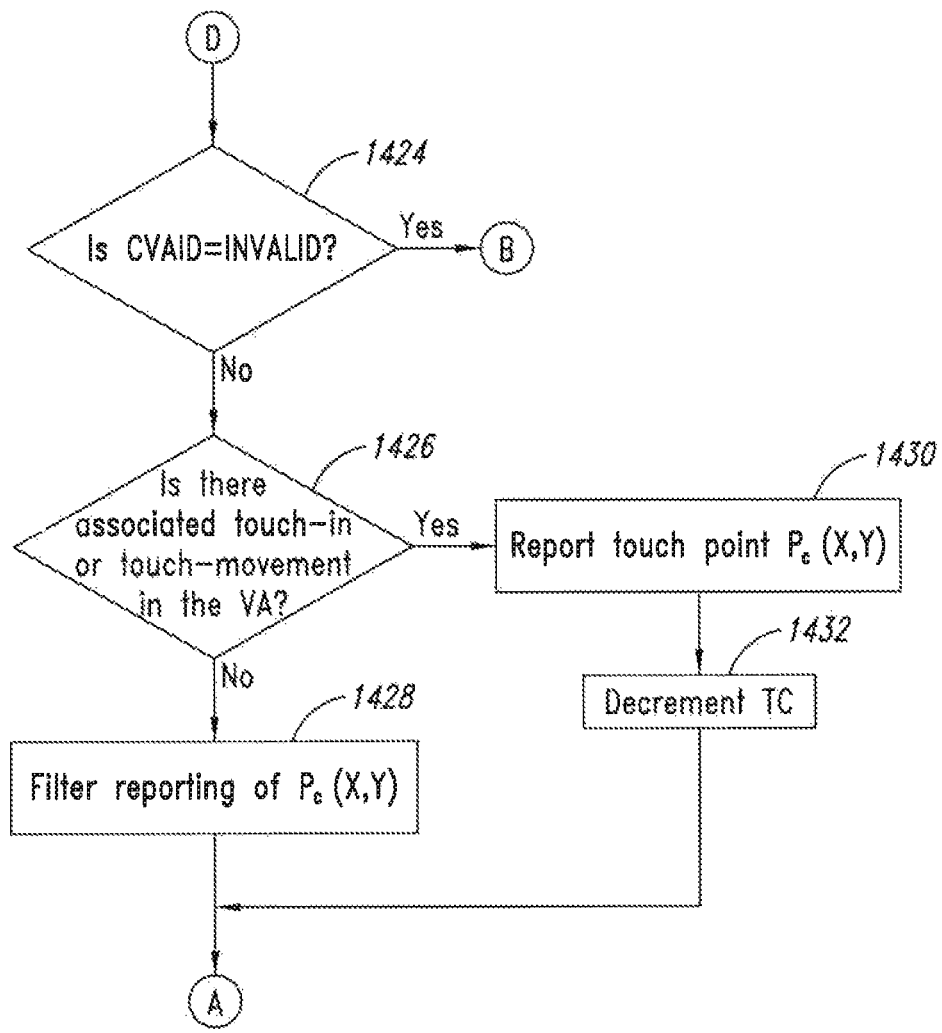

FIGS. 14A-14C are a flowchart illustrating in more detail the operation of applying touch count filtering of FIG. 10. The process begins in step 1400 and proceeds immediately to step 1402 and determines from the associated touch information TI the type of touch event TE associated with the current touch point $P_C(X,Y)$. From step 1402 the process goes to step 1404 and determines the whether the type of touch event TE associated with the current touch point $P_C(X,Y)$ is a touch-in event. When the determination in step 1404 is positive the touch information TI indicates a touch-in event is associated with the current touch point $P_C(X,Y)$, and the process then proceeds to step 1406. In step 1406 the process determines whether the current virtual area identifier CVAID associated with the current touch point $P_C(X,Y)$ is invalid (CVAID=INVALID). Recall, the current virtual area identifier CVAID of the current touch point $P_C(X,Y)$ has been set to the virtual area identifier of one of the virtual areas VA1-N in steps 1006 and 1008 of FIG. 10. If the virtual area identifier is set INVALID, then the determination in step 1406 is positive and the process goes to step 1408 and filters reporting of the current touch point $P_C(X,Y)$. The current touch point $P_C(X,Y)$ is not reported or is filtered when the current virtual area identifier CVAID is set INVALID. From step 1408 the process then goes to step 1410 and terminates.

If the determination in step 1406 is negative then the touch information TI of the current touch point $P_C(X,Y)$ is assigned to one of the defined virtual areas VA1-VAN. For example, referring back to FIG. 5 if the current touch point $P_C(X,Y)$ corresponds to P4(X4,Y4) then the current virtual area identifier CVAID=VA4. Thus, when the determination in step 1406 is negative the process goes to step 1412 and determines the current touch count TC of the identified virtual area VA. Note that the flowchart of FIG. 14 illustrates one embodiment of a touch-count filtering process and thus in the present description the identified virtual area VA associated with the current touch point $P_C(X,Y)$ is assumed to implement touch-count filtering. Accordingly, the touch-count parameters, namely the current touch count TC and the virtual-area-touch-count (VATC) threshold, of the identified virtual area VA have valid values.

From step 1412 the process goes to step 1414 and determines whether the current touch count TC of the identified virtual area VA is less than the VATC threshold of the virtual area. When the determination in step 1414 is positive, meaning the current touch count TC is less than the VATC threshold, the process goes to step 1416 and the current touch point $P_C(X,Y)$ is reported. From step 1416 the process then proceeds to step 1418 in increments the value of the current touch count TC. After step 1418 the process proceeds to step 1410 and terminates. When the determination in step 1414 is negative this indicates the current touch count TC has reached the VATC threshold for the identified virtual area VA. In this situation, the process proceeds from step 1414 to step 1420 and the current touch point $P_C(X,Y)$ is filtered (i.e., not reported). The process then proceeds from step 1420 to step 1410 and terminates.

Returning now to step 1404, when the determination in step 1404 is negative this means the type of touch event TE is associated with the current touch point $P_C(X,Y)$ is not a touch-in event, and the process then proceeds to step 1422. In step 1422, the process determines whether the type of touch event TE associated with the current touch point $P_C(X,Y)$ is a touch-out event. When the determination in step 1422 is positive, the process proceeds to step 1424 and once again determines whether the current virtual area identifier CVAID associated with the current touch point $P_C(X,Y)$ is invalid (CVAID=INVALID). When the current virtual area identifier CVAID is INVALID, the determination in step 1424 is positive and the process proceeds to step 1408 and filters reporting of the current touch point $P_C(X,Y)$ and then proceeds to step 1410 and terminates.

When the current virtual area identifier CVAID is valid, the determination in step 1424 is negative and the process proceeds to step 1426 and determines whether there is a touch-in or touch-movement type of touch event TE currently associated with the identified virtual area VA. This information can be obtained by the virtual area filtering algorithm 103 (FIG. 3) from the touch information TI associated with the prior touch point $P_P(X,Y)$. If the determination in step 1426 is positive, then the process proceeds to step 1430 and reports the current touch point $P_C(X,Y)$. From step 1430 the process goes to step 1432 and decrements the current touch count TC associated with the identified virtual area VA. The current touch count TC is decremented in this situation because as determined in step 1422 the type of touch event TE associated with the current touch point $P_C(X,Y)$ is a touch-out event and thus the current touch count of the identified virtual area VA should be reduced by one. The process then goes to step 1410 and terminates. If the determination in step 1426 is negative, then the current touch point $P_C(X,Y)$ is filtered in step 1428 (i.e., the touch-out type of touch event TE and touch information TI of the current touch point $P_C(X,Y)$ are filtered in step 1428). The process then proceeds to step 1410 and terminates.

Returning now to step 1422, when the determination in this step is negative the process proceeds to step 1434 and determines the type of touch event TE associated with the current touch $P_C(X,Y)$ is a touch-movement type touch event. The process then proceeds to step 1436 and determines whether the current virtual area identifier CVAID and the previous virtual area identifier PVAID are both INVALID. Once again, the previous virtual area identifier PVAID is determined from the touch information associated with a previous touch point $P_P(X,Y)$. When the determination in step 1436 is positive, the process proceeds seven 1408 and filters reporting of the current touch point $P_C(X,Y)$. The process then proceeds to step 1410 and terminates.

When the determination in step 1436 is negative, then at least one of the current virtual area identifier CVAID and the previous virtual area identifier PVAID is valid, and the process then proceeds to filter or report the current touch point $P_C(X,Y)$ based upon the values of the current virtual area identifiers, as will now be described in more detail with regard to steps 1438-1456. A negative determination in step 1436 leads the process to step 1438 and the process determines whether the current virtual area identifier CVAID=VALID and the previous virtual area identifier PVAID=INVALID. If the determination in step 1438 is positive then the process proceeds to step 1440 and reports the current touch point $P_C(X,Y)$ as a touch-in event.

Note that the reporting of the current touch point $P_C(X,Y)$ in step 1440 as a touch-in type of event results in a change in type from the original touch event TE associated with the current touch point $P_C(X,Y)$, which is a touch-motion type event as previously discussed for step 1434. This is true because as discussed with reference to step 1438, the previous virtual area identifier PVAID is INVALID so the current touch point $P_C(X,Y)$ is not really a touch-motion type touch event TE of the previous touch point since the previous touch point is located in an invalid virtual area (i.e., PVAID=INVALID). From step 1440 the process goes to step 1442 and increments the current touch count TC since the current touch point $P_C(X,Y)$ is being counted as a touch in type touch event TE the current virtual area VA and the touch count must be incremented to properly track the number of touches in the virtual area for touch-count filtering purposes. The process then goes to step 1410 and terminates.

When the determination in step 1438 is negative, the process proceeds to step 1444 and determines whether the current virtual area identifier CVAID=INVALID and the previous virtual area identifier PVAID=VALID. When the determination in step 1444 is positive, the process proceeds to step 1446 and reports the current touch point $P_C(X,Y)$ as a touch-out type touch event TE. The process then goes to step 1448 and decrements the current touch count TC of the previous virtual area VA associated with the previous touch point $P_P(X,Y)$. Once again, reporting of the current touch point $P_C(X,Y)$ in step 1446 as a touch-out type of touch event TE results in a change in type from the original touch event associated with the current touch point $P_C(X,Y)$, which is a touch-motion type event as previously discussed for step 1434. This occurs in this situation because the current virtual area identifier CVAID=INVALID for the current touch point $P_C(X,Y)$ and since the previous virtual area identifier PVAID=VALID for the previous touch point $P_P(X,Y)$ the current touch point is considered a touch-out type touch event TE relative to the prior touch point. The current touch point $P_C(X,Y)$ cannot in this situation be a legitimate touch-motion type touch event TE since the current virtual area identifier CVAID is INVALID.

When the determination in step 1444 is negative, the process proceeds to step 1450 and in this situation both the current virtual area identifier CVAID and the previous virtual area identifier PVAID are VALID. From step 1450 the process then proceeds to step 1452 and reports the current touch point $P_C(X,Y)$ with the associated advanced touch information ATI including the current virtual area identifier CVAID. The process then proceeds to step 1454 and increments the touch count TC for the current virtual area VA (i.e., the virtual area having the current virtual area identifier CVAID) and then proceeds to step 1456 and decrements the touch count TC for the previous virtual area having the previous virtual area identifier PVAID. The process then proceeds from step 1456 to step 1410 and terminates.

When both the current virtual area identifier CVAID and the previous virtual area identifier PVAID are VALID, the current touch point $P_C(X,Y)$ has transitioned or removed from the virtual area VA corresponding to the PVAID identifier to the virtual area corresponding to the CVAID. This is a valid touch-motion type touch event TE and this situation can be effectively treated as two events for the purposes of the touch counts TC of each of these virtual areas VA, one in the previous virtual area having PVAID and one in the current virtual area having CVAID. The touch event TE in the previous virtual area VA having PVAID can be viewed as a touch-out event for this virtual area and thus the touch count TC of this virtual area is decremented in step 1456. The touch event TE in the current virtual area VA having CVAID can be viewed as a touch-in event for this virtual area and thus the touch count TC of this virtual area is incremented in step 1454. This is truly a touch-motion event and is reported as such in step 1452 that the above example is meant to illustrate the rationale for incrementing and decrementing the touch counts TC in step 1454 and 1456 for the current virtual area VA having CVAID and the previous virtual area having PVAID.

Figure 15:
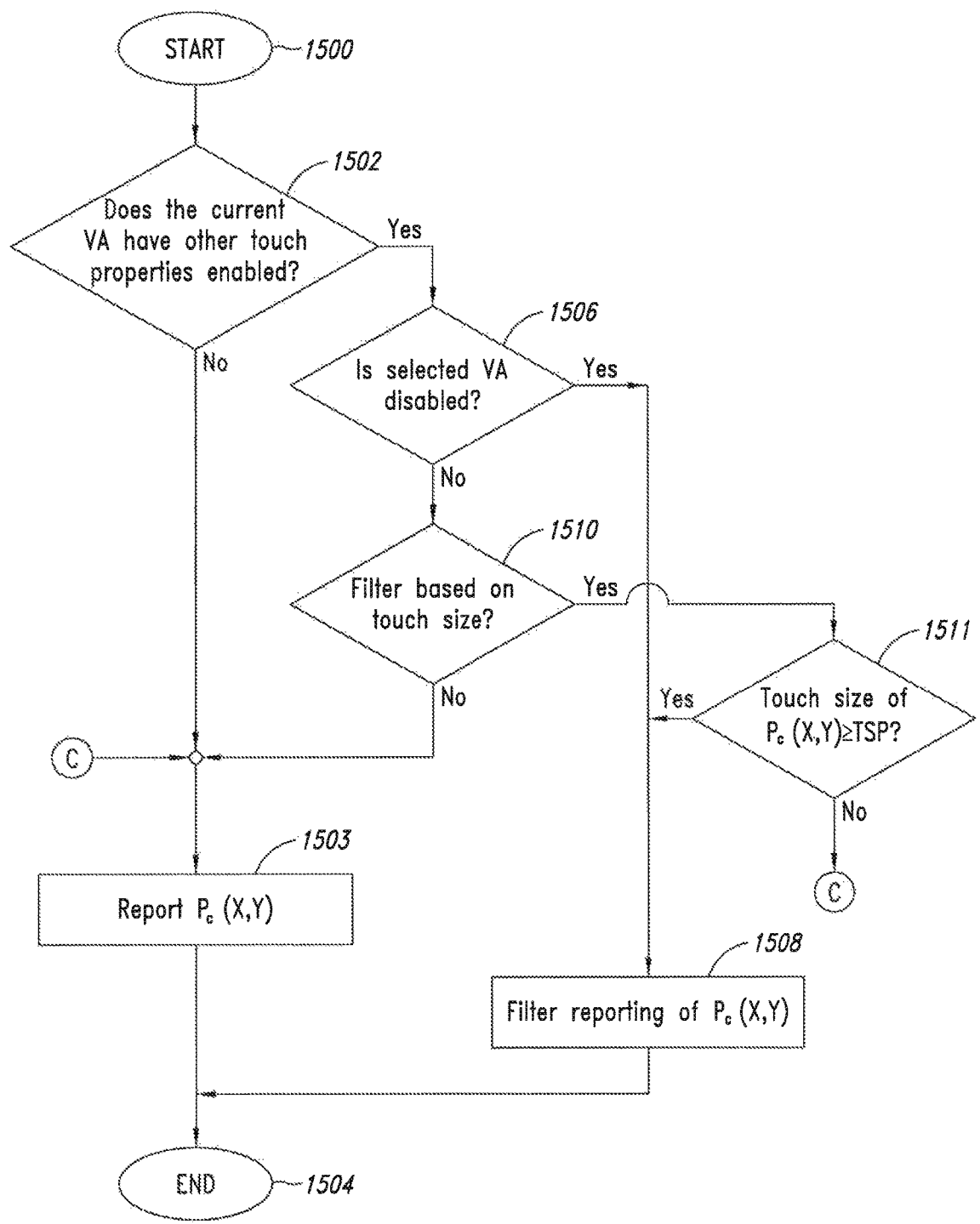
FIG. 15 is a flowchart illustrating in more detail the operation of filtering touch points based upon other virtual area parameters of FIG. 10.

FIG. 15 is a flowchart illustrating in more detail the operation of filtering touch points based upon other virtual area parameters as previously described for step 1014 in the process of FIG. 10. The process begins in step 1500 and proceeds immediately to step 1502 and determines whether the currently selected virtual area VA has additional touch properties enabled that may result in filtering of the current touch point $P_C(X,Y)$. When the determination in step 1502 is negative this indicates the currently selected virtual area VA has no additional parameters defined on which filtering of the current touch point $P_C(X,Y)$ may be based. Accordingly, in this situation the process proceeds to step 1503 and reports the current touch point $P_C(X,Y)$ and then goes immediately to step 1504 and terminates.

When the determination in step 1502 is positive, the process proceeds to step 1506 and determines whether or not to filter reporting of the current touch point $P_C(X,Y)$ based on these additional virtual area parameters. In step 1506, the process determines whether the selected virtual area VA is disabled by examining the enablement parameter previously described with reference to FIG. 9. When the determination in step 1506 is positive, the process proceeds to step 1508 and filters reporting of the current touch point $P_C(X,Y)$. From step 1508 the process then proceeds to step 1504 and terminates. Returning to step 1506, when the determination in step 1506 is negative the process proceeds to step 1510 and determines whether to filter the current touch point $P_C(X,Y)$ based upon the touch size parameter TSP (FIG. 9) defined for the currently selected virtual area VA. When the determination in step 1510 is positive this indicates the current touch point $P_C(X,Y)$ is to be filtered based upon the touch size information contained in the touch information TI for the current touch point and the defined touch size parameter TSP for the currently selected virtual area VA. In this situation, the process proceeds from step 1510 to step 1511 determines whether the touch size of the current touch point $P_C(X,Y)$ is greater than or equal to the touch size parameter TSP. When the determination in step 1511 is negative, indicating the touch size of the current touch point $P_C(X,Y)$ is less than threshold set by the touch size parameter TSP, the process goes to step 1508 and filters reporting of the current touch point $P_C(X,Y)$ and thereafter proceeds to step 1504 and terminates. When the determination in step 1511 is negative, the touch size of the current touch point $P_C(X,Y)$ is greater than or equal to the touch size parameter TSP and so the process goes to step 1503 and reports the current touch point $P_C(X,Y)$ and then goes to step 1504 and terminates. The process of FIG. 15 may also include other filtering criteria based upon other virtual are parameters defined for the selected virtual area VA.

The type of applications 110 executing on the processing circuitry 108 will vary depending on the type of electronic device 100. Where the electronic device 100 is a cell or smart phone or a tablet computer, for example, the applications 110 can include a wide variety of different types of applications, such as music applications, email applications, video applications, game applications, reading applications, and so on.

One skilled in the art will understood that even though various embodiments and advantages of the present disclosure have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A touch controller, comprising: a touch frame processing circuit configured to receive sensor signals containing information about a touch point on a touch screen, the touch frame processing circuit configured to process the sensor signals to generate touch information associated with each touch point, the generated touch information including a detected type of touch event from among a plurality of different types of touch events that is associated with the touch point; and a touch coordinate processing circuit coupled to receive the touch information from the touch frame processing circuit, the touch coordinate processing circuit including virtual area parameters that define a plurality of virtual areas on the touch screen, the virtual area parameters further including touch event parameters defining the types of touch events that will be reported and filtered for the virtual area from among touch-in, touch-out and touch-motion types of touch events, and the touch coordinate processing circuit configured to identify which one of the plurality of virtual areas contains a current touch point and to detect the type of touch event associated with the current touch point from among the plurality of different types of touch events, and wherein the touch coordinate processing circuit is configured to report and filter the current touch point based on both the identified virtual area and the detected type of touch event associated with the current touch point, and wherein the configurable virtual area parameters further comprise for each virtual area: a virtual area identifier having a value that uniquely identifies the virtual area; a layer parameter defining the virtual area as a top or bottom layer; an enablement parameter having a first value that enables the virtual area and a second value that disables the virtual area; touch-count parameters that define a current touch count and a virtual area touch count threshold for the virtual area; and a touch size parameter having a value that defines at least one of the permissible sizes of the current touch point for the virtual area.

2. The touch controller of claim 1, wherein when the touch coordinate processing circuit reports the current touch point this reporting includes advanced touch information that includes a virtual area identifier indicating which one of the virtual areas contains the current touch point.

3. The touch controller of claim 2, wherein the advanced touch information includes a location of the current touch point and the association of a type of touch event with the current touch point includes associating one of a touch-in, touch-out, and touch-motion type of touch event with the current touch point.

4. The touch controller of claim 3,
wherein the touch information generated by the touch frame processing circuit includes the association of one of the touch-in, touch-out, and touch-motion type of touch events with the current touch point; and
wherein the touch coordinate processing circuit is further configured to change the type of touch event reported for the current touch point as a function of the identified virtual area containing the current touch point and an identified virtual area containing a previous touch point.

5. The touch controller of claim 1, wherein the touch coordinate processing circuit includes a plurality of registers operable to store configurable virtual area parameters that define the plurality of virtual areas and the characteristics of the virtual areas.

6. The touch controller of claim 5, wherein the virtual areas have a plurality of different shapes, the configurable virtual area parameters including virtual area coordinate parameters that define the shape of each virtual area.

7. The touch controller of claim 1, wherein the touch information for the current touch point includes touch pressure, touch size, touch event, and touch location information.

8. A method of filtering detected touch points on a touch screen, the method comprising:
determining a location of a touch point on a touch screen;
identifying which one of a plurality of virtual areas on the touch screen includes the location of the touch point;
assigning a valid type of touch event or events to each virtual area;
detecting a type of touch event for the touch point from amongst a plurality of different types of touch events that may occur in each of the virtual areas; and
filtering reporting of the touch point based upon the identified virtual area and whether the detected type of the touch event corresponds to the valid type of touch event or events assigned to the virtual area, and wherein filtering reporting of the touch point based upon the identified virtual area comprises filtering reporting when the touch count reaches the virtual area touch count threshold.

9. The method of claim 8, wherein each virtual area has a corresponding virtual area identifier and the operation of identifying includes assigning the virtual area identifier of the identified virtual area to the touch point.

10. The method of claim 9, wherein at least some of the virtual areas have a layer parameter that defines the virtual area as a top overlapping layer and at least some of the virtual areas have a layer parameter that defines the virtual area as a bottom overlapping layer, and wherein the operation of identifying further comprises:
determining whether any of the virtual layers defined as top overlapping layers includes the touch point; and
if the touch point is not included in any of the virtual areas defined as top overlapping layers, determining if the touch point is included in any of the virtual areas defined as bottom overlapping layers.

11. The method of claim 8, wherein the operation of identifying comprises identifying the virtual area utilizing virtual area coordinates that define the virtual area and the location of the touch point.

12. The method of claim 8, wherein determining a location of a touch point on a touch screen further comprises generating touch information for the touch point, the touch information including the location of the touch point and including the type of touch event for the touch point.

13. The method of claim 12, wherein filtering reporting of the touch point based upon the identified virtual area and the type of touch event includes comparing virtual area parameters associated with the identified virtual area to the touch information.

14. The method of claim 13, wherein the virtual area parameters comprise for each virtual area:
virtual area coordinate parameters that define a shape of the virtual area;
a virtual area identifier having a value that uniquely identifies the virtual area;
a layer parameter defining the virtual area as a top or bottom layer;
an enablement parameter having a first value that enables the virtual area and a second value that disables the virtual area;
touch-count parameters that define a current touch count and a virtual area touch count threshold for the virtual area;
a touch size parameter having a value that defines at least one permissible size of the current touch point for the virtual area; and
virtual area touch event parameters having values indicating the types of touch events that will be reported for the virtual area.

15. An electronic system, comprising:
processing circuitry;
a touch screen; and
a touch controller coupled to the processing circuitry and the touch screen, the touch controller comprising:
a touch frame processing circuit configured to receive sensor signals containing information about a touch point on a touch screen, the touch frame processing circuit configured to process the sensor signals to generate touch information associated with each touch point, the touch information including a detected type of touch event for the touch point where each touch point has one of a plurality of different types of touch events associated with the touch point including touch-in, touch-out and touch-motion types of touch events; and
a touch coordinate processing circuit coupled to receive the touch information from the touch frame processing circuit, the touch coordinate processing circuit including virtual area parameters that define a plurality of virtual areas on the touch screen, the touch coordinate processing circuit configured to identify which one of the plurality of virtual areas contains a current touch point and to associate a type of detected touch event with the current touch point from among the plurality of different type of touch events, and the touch coordinate processing circuit further configured to report and filter the current touch point as a function of the identified virtual area and the type of touch event associated with the touch point, and wherein the configurable virtual area parameters further comprise for each virtual area: a virtual area identifier having a value that uniquely identifies the virtual area; a layer parameter defining the virtual area as a top or bottom layer; an enablement parameter having a first value that enables the virtual area and a second value that disables the virtual area; touch-count parameters that define a current touch count and a virtual area touch count threshold for the virtual area; and a touch size parameter having a value that defines at least one of the permissible sizes of the current touch point for the virtual area.

16. The electronic system of claim 15, wherein the processing circuitry comprises cellular telephone processing circuitry.

17. The electronic system of claim 15, wherein the touch screen comprises a capacitive touch screen.

18. The electronic system of claim 15, wherein each of the touch frame processing and touch coordinate processing circuits comprises software executing on suitable digital circuitry.

19. The electronic system of claim 15, wherein when the touch coordinate processing circuit reports the current touch point this reporting includes advanced touch information that includes a virtual area identifier indicating which one of the virtual areas contains the current touch point.

20. The electronic system of claim 19, wherein the advanced touch information includes a location of the current touch point and the association of one of a touch-in, touch-out, and touch-motion type of touch event with the current touch point.

21. The electronic system of claim 20,
wherein the touch information generated by the touch frame processing circuit includes the association of one of a touch-in, touch-out, and touch-motion type of touch event with the current touch point; and
wherein the touch coordinate processing circuit is further operable to change the type of touch event reported for the current touch point as a function of the identified virtual area containing the current touch point and an identified virtual area containing a previous touch point.

22. The electronic system of claim 15, wherein the touch coordinate processing circuit includes a plurality of registers operable to store configurable virtual area parameters that define the plurality of virtual areas and the characteristics of the virtual areas.

23. The touch controller of claim 1, wherein the defined plurality of virtual areas on the touch screen include at least some overlapping virtual areas.

24. The touch controller of claim 23, wherein configurable virtual area parameters define the plurality of virtual areas and the characteristics of the virtual areas, and wherein the configurable virtual area parameters further comprise for each virtual area a layer parameter defining the virtual area as a top or bottom layer to thereby enable at least some of the virtual areas to be overlapping virtual areas.

25. The touch controller of claim 23, wherein configurable virtual area parameters define the plurality of virtual areas and the characteristics of the virtual areas, and wherein the configurable virtual area parameters further comprise for each virtual area touch-count parameters that define a current touch count and a virtual area touch count threshold for the virtual area.

26. A touch controller, comprising:
a touch frame processing circuit adapted to receive sensor signals containing information about a touch point on a touch screen, the touch frame processing circuit operable to process the sensor signals to generate touch information associated with each touch point, the generated touch information including a detected type of touch event associated with the touch point wherein the type of touch event is one of a touch-in, touch-motion and touch-out type of touch event; a touch coordinate processing circuit coupled to receive the touch information from the touch frame processing circuit, the touch coordinate processing circuit including virtual area parameters that define a plurality of virtual areas on the touch screen, the touch coordinate processing circuit operable to identify which one of the plurality of virtual areas contains a current touch point and to report and filter the current touch point based on both the identified virtual area and the detected type of touch event associated with the current touch point is a touch-in, touch-motion, or touch-out type of touch event; wherein the touch coordinate processing circuit includes a plurality of registers operable to store configurable virtual area parameters that define the plurality of virtual areas and the characteristics of the virtual areas; wherein the virtual areas have a plurality of different shapes, the configurable virtual area parameters including virtual area coordinate parameters that define the shape of each virtual area; and wherein the configurable virtual area parameters further comprise for each virtual area; a virtual area identifier having a value that uniquely identifies the virtual area; a layer parameter defining the virtual area as a top or bottom layer; an enablement parameter having a first value that enables the virtual area and a second value that disables the virtual area; touch-count parameters that define a current touch count and a virtual area touch count threshold for the virtual area; a touch size parameter having a value that defines at least one of the permissible sizes of the current touch point for the virtual area; and virtual area touch event parameters having values indicating the types of touch events that will be reported for the virtual area.

27. The touch controller of claim 26, wherein when the touch coordinate processing circuit reports the current touch point this reporting includes advanced touch information that includes a virtual area identifier indicating which one of the virtual areas contains the current touch point.

28. The touch controller of claim 27, wherein the advanced touch information includes a location of the current touch point and the association of one of a touch-in, touch-out, and touch-motion type of touch event with the current touch point.

29. A method of filtering detected touch points on a touch screen, the method comprising:
determining a location of a touch point on a touch screen;
identifying which one of a plurality of virtual areas on the touch screen includes the location the touch point; and
filtering reporting of the touch point based upon the identified virtual area;
wherein determining a location of a touch point on a touch screen further comprises generating touch information for the touch point, the touch information including the location of the touch point and including a type of touch event for the touch point, each touch point having one of plurality of different types including touch-in, touch-out and touch-motion types of touch events;
wherein filtering reporting of the touch point based upon the identified virtual area includes comparing virtual area parameters associated with the identified virtual area to the touch information; and wherein the virtual area parameters comprise for each virtual area:
virtual area coordinate parameters that define a shape of the virtual area;
a virtual area identifier having a value that uniquely identifies the virtual area;
a layer parameter defining the virtual area as a top or bottom layer;
an enablement parameter having a first value that enables the virtual area and a second value that disables the virtual area;
touch-count parameters that define a current touch count and a virtual area touch count threshold for the virtual area;
a touch size parameter having a value that defines at least one permissible size of the current touch point for the virtual area; and
virtual area touch event parameters having values indicating the type or types of touch events that will be reported for the virtual area; and
wherein filtering reporting of the touch point based upon the identified virtual area comprises filtering based upon the type of touch event in the touch information of the touch point and the virtual area touch event parameters for the identified virtual area, wherein touch events having some types being filtered and touch events having other types not being filtered.

30. A method of filtering detected touch points on a touch screen, the method comprising:
determining a location of a touch point on a touch screen;
detecting a type of the touch point, wherein the type is one of a touch-in, touch-out, and touch-motion type of touch event;
identifying which one of a plurality of virtual areas on the touch screen includes the location the touch point;
filtering reporting of the touch point based upon the identified virtual area and the detected type of the touch point from amongst the touch-in, touch-out and touch-motion types of touch events; and
wherein filtering reporting of the touch point based upon the identified virtual area comprises filtering reporting when the touch count reaches the virtual area touch count threshold.

31. The method of claim 30, wherein each virtual area has a corresponding virtual area identifier and the operation of identifying includes assigning the virtual area identifier of the identified virtual area to the touch point.

* * * * *